(12) United States Patent
Kochhar et al.

(10) Patent No.: US 11,361,353 B2
(45) Date of Patent: Jun. 14, 2022

(54) SYSTEM, MANUFACTURE, AND METHOD FOR DISTRIBUTED GIFTING TRANSACTIONS BASED ON MERCHANT WEBSITE DATA

(71) Applicant: SmartGift, Inc., Brooklyn, NY (US)

(72) Inventors: Monika Kochhar, Brooklyn, NY (US); Bernd Strenitz, Brooklyn, NY (US); Orhan Kutlu, Atasehir/ Istanbul (TR); Jakub Kohout, Brooklyn, NY (US); Ariel Schleicher, Brooklyn, NY (US)

(73) Assignee: SmartGift, Inc., Brooklyn, NY (US)

( * ) Notice: Subject to any disclaimer, the term of this patent is extended or adjusted under 35 U.S.C. 154(b) by 0 days.

(21) Appl. No.: 16/860,211

(22) Filed: Apr. 28, 2020

(65) Prior Publication Data

US 2021/0090147 A1    Mar. 25, 2021

Related U.S. Application Data

(62) Division of application No. 16/579,998, filed on Sep. 24, 2019, now Pat. No. 10,679,268.

(51) Int. Cl.
| | |
|---|---|
| *G06Q 30/00* | (2012.01) |
| *G06Q 30/06* | (2012.01) |
| *H04L 51/52* | (2022.01) |

(52) U.S. Cl.
CPC ......... *G06Q 30/0613* (2013.01); *G06Q 30/06* (2013.01); *G06Q 30/0601* (2013.01);
(Continued)

(58) Field of Classification Search
CPC ...... G06Q 30/0601–0645; G06Q 30/08; H04L 51/32
(Continued)

(56) References Cited

U.S. PATENT DOCUMENTS

| | | | | |
|---|---|---|---|---|
| 2008/0243630 A1* | 10/2008 | Farney | ................. | G06Q 10/083 |
| | | | | 705/26.41 |
| 2010/0023341 A1* | 1/2010 | Ledbetter | ............... | G06Q 10/10 |
| | | | | 705/1.1 |

(Continued)

OTHER PUBLICATIONS

Choose-Your-Gift, Chooseyourgift.com, Dec. 18, 2018, accessed at [https://web.archive.org/web/20181218145855/https://www.chooseyourgift.com/products/products.asp] (Year: 2018).*

*Primary Examiner* — Jeffrey A. Smith
*Assistant Examiner* — Lindsey B Smith
(74) *Attorney, Agent, or Firm* — Meister Seelig & Fein LLP; Seth H. Ostrow, Esq.

(57) ABSTRACT

A system comprising a file server configured to receive merchant and product data from a merchant server, a data backend that manages access and retrieval of the merchant and product data, a sender interface coupled to the data backend that communicates with a sender client device to create a gift transaction from a virtual shopping bag, the virtual shopping bag including a product assortment selected based on the merchant and product data, a recipient interface coupled to the data backend that communicates with a recipient client device to receive a selection from the product assortment, and a widget interface that interfaces with a website integration component that is embedded on a merchant website, the website integration component adds the virtual shopping bag to the merchant website and imports a feature to create the gift transaction with the virtual shopping bag.

20 Claims, 41 Drawing Sheets

(52) U.S. Cl.
CPC ..... *G06Q 30/0603* (2013.01); *G06Q 30/0633* (2013.01); *G06Q 30/0635* (2013.01); *G06Q 30/0641* (2013.01); *G06Q 30/0643* (2013.01); *H04L 51/32* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 2010/0299228 A1* | 11/2010 | Smith .................... | G06Q 30/02 705/26.8 |
| 2013/0073421 A1* | 3/2013 | Poisson ................. | G06Q 30/02 705/26.7 |
| 2013/0246524 A1* | 9/2013 | Berner ................... | G06Q 50/01 709/204 |
| 2014/0207610 A1* | 7/2014 | Erez ........................ | G07F 17/40 705/26.81 |
| 2014/0279282 A1* | 9/2014 | Begg .................. | G06Q 30/0641 705/27.1 |
| 2014/0372251 A1* | 12/2014 | Rodell ................ | G06F 3/04842 705/26.7 |
| 2015/0310567 A1* | 10/2015 | Wu ........................ | G06Q 20/10 705/26.5 |
| 2016/0232482 A1* | 8/2016 | Anantharaju ...... | G06Q 30/0639 |
| 2017/0316440 A1* | 11/2017 | Isaacson ................ | G06Q 40/02 |

* cited by examiner

Delivery Information

First Name
[Enter first name]
Your first name is required

Last Name
[Enter last name]

Delivery Location Type
[Select location type ›]

Delivery Address
[Enter delivery address]

Apt / Suite / Room (Optional)
[Enter secondary address]

Delivery Zip Code
[Enter zip code]

Serene Green™

Fig. 44

SYSTEM, MANUFACTURE, AND METHOD FOR DISTRIBUTED GIFTING TRANSACTIONS BASED ON MERCHANT WEBSITE DATA

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to online transactions, and in particular, distributed gifting transactions that are conducted on a third-party system using merchant website content.

Description of the Related Art

Gifts are given for a variety of holidays and special occasions. They are an expression of our appreciation and gratitude towards friends, family, acquaintances, or existing or prospective customers. However, often times finding the right present and sending it to the recipient on time can be a daunting enterprise. The advent of modern internet technology has provided a great convenience. Online stores offer the alternative solution of shopping conveniently from any location and time by browsing electronic catalogues on a personal computer or mobile device.

Online stores operate one or more online web sites (also referred to as electronic storefronts or e-commerce sites) accessed via the Internet and the World-Wide Web via web browser. The web sites host various web pages via which an online store is enabled to showcase their goods, accept payments, and collect delivery information. Even though online shopping has added the convenience of shopping from home or other places where an internet connection is available, and may offer a wider selection and/or better prices, buying gifts online is still not a very convenient experience.

Using existing e-commerce methods, the most straightforward way to purchase a gift and convey the gift to a recipient is to buy one or more gift items online as a regular purchase and have the item(s) shipped directly to the gift recipient's home address or any other address of the recipient, such as an office address, if known to the giver. Many shopping cart/checkout schemes on online store web sites allow a purchase to be shipped to a different shipping address than the purchaser's billing address. In this case the gift giver needs to accurately input the shipping information to ensure it is shipped to the correct address. Entry of an errant address may either cause the item to be shipped to the wrong address, or cause a delay if it is determined by either the store or the shipper that the entered address does not actually exist. It also is often advisable to inform the gift recipient that a gift is being sent in order to coordinate receipt of the delivery. For example, the recipient may be out of town, and would not be available to receive a shipment that might be left on the recipient's doorstep which would be at risk of being stolen.

Another deficiency of current e-commerce methods include the problem of knowing a correct size or color and style preference of a gift recipient for gift items such as clothing. Asking the gift recipient for such details may sometimes be impractical and ruins the surprise nature of the gift. Picking a wrong size or the gift recipient preferring a different color or style, etc., would then require the recipient going through the trouble of shipping the product back for a replacement, again ruining the gift giving experience.

Existing e-commerce platforms are limited to sending single gift items, thus forcing a giver who wants to give multiple gifts to purchase them in separate transactions, and forcing the recipient to review and accept them in multiple transactions.

There is thus a need for an online shopping tool that offers an enhanced gifting experience.

SUMMARY OF THE INVENTION

The present invention provides a system for importing gift transaction functions to a merchant website from a third-party transaction system. According to one embodiment, the system comprises a file server configured to receive merchant and product data from a merchant server, a database that stores the received merchant and product data, a data backend communicatively coupled to the database, the data backend managing access and retrieval of the merchant and product data, a sender interface coupled to the data backend that communicates with a sender client device to create a gift transaction from a virtual shopping bag, the virtual shopping bag including a product assortment defined by the sender client device based on the merchant and product data, a recipient interface coupled to the data backend that communicates with a recipient client device to receive a selection from the product assortment made by the recipient, and a widget interface that interfaces with a website integration component that is embedded on a merchant website, the website integration component adds the virtual shopping bag to the merchant website and imports a feature to create the gift transaction with the virtual shopping bag.

The data backend may be further configured to create payment links that direct the sender client device to the merchant server for checkout and payment of the gift transaction based on the selection from the product assortment. The system may further include a payment system coupled to the data backend, wherein the payment system is configured to handle the checkout of the gift transaction. The payment system may include an inventory system configured to check availability of products in the gift transaction based on the merchant and product data. The system may further include an analytics interface coupled to the data backend, the analytics interface configured to allow the merchant server to access user, transaction, and system performance data, and user behaviors associated with the sender client device and the recipient client device.

The system may also include a peer-to-peer sharing interface configured to communicate the gift transaction between the sender client device and the recipient client device. The peer-to-peer sharing interface may transmit the gift transaction over at least one of email, text message, and social network communications. The gift transaction may include an option that allows a user of the recipient client device to provide a selection selected from the group consisting of: color, style, shape, configuration, and size of a product from the product assortment. The virtual shopping bag may be created on the merchant website to store the product assortment. In one embodiment, the gift transaction includes a free product added to the product assortment in the virtual shopping bag by the merchant server. The sender interface may be configured to save the virtual shopping bag and transfer the shopping bag to additional senders to add products to the virtual shopping bag. In another embodiment, the gift transaction may be re-designated to another recipient by the recipient client device.

In another aspect, the present invention provides a system for generating customer care gifts. According to one embodiment, the system comprises a processor and a memory having executable instructions stored thereon that when executed by the processor cause the processor to receive a selection of a gift transaction value, generate a gift transaction based on the gift transaction value and customer information retrieved from a data source, transmit a gift notification to a customer entity, the gift notification including a link to redeem the gift transaction by directing a client device associated with the customer entity to the processor, generate gift options based on the gift transaction value, receive selection from the gift options, receive delivery details to redeem the gift transaction with the selection from the gift options, and generate an order based on the selection from the gift options and the delivery details.

The customer information may include name, address, email address, and phone number. The customer information may be loaded from customer relationship manager software. The gift transaction value may include a product assortment or a monetary amount. The selection from the gift option may include a selection selected from the group consisting of: preferred size, color, shape, configuration, and style. In one embodiment, the selection from the gift option includes a swap for a different product. In another embodiment, the processor re-designates the gift transaction to another recipient based on an instruction from the customer entity. The processor may further generate a service feedback of product preferences.

BRIEF DESCRIPTION OF THE DRAWINGS

The invention is illustrated in the figures of the accompanying drawings which are meant to be exemplary and not limiting, in which like references are intended to refer to like or corresponding parts.

FIG. 7B illustrates an exemplary interface for providing sender information to the gift transaction system according to an embodiment of the present invention.

FIGS. 17 through 20 illustrate exemplary interfaces for creating and sending customer care gifts according to an embodiment of the present invention.

FIGS. 29 through 30 illustrate exemplary interfaces for providing delivery information according to an embodiment of the present invention.

FIG. 39-46 illustrate exemplary interfaces for providing gift transactions as sweepstakes prizes according to an embodiment of the present invention.

DETAILED DESCRIPTION OF THE INVENTION

Figure 1:
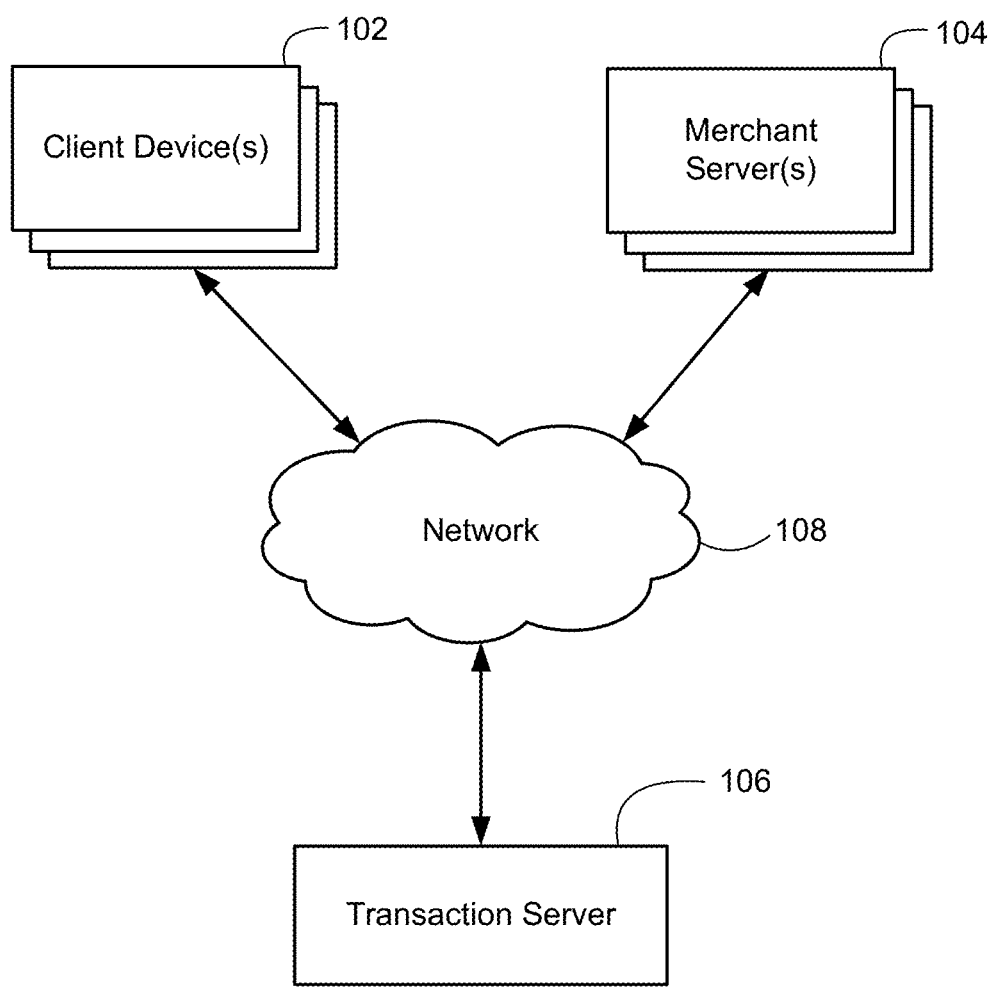
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses an online third-party gift transaction system that allows merchants to include a website integration component on their websites for importing functionalities through the gift transaction system. The integration component may allow gift senders to buy a gift for another person (recipients) from those merchants through a web interface generated by the gift transaction system. The gift transaction system may allow the gift senders to select a range of products for the recipients to choose from and charge the gift senders when the recipient accepts and finalizes gift selection. According to one embodiment, the gift transaction system may provide a tool for creating and supporting sweepstakes in a promotional environment. In another embodiment, the disclosed gift transaction system may provide a software interface that can be used to give gifts as a reward to retain and reactivate customers. Other examples may include using the gift transaction system for customer retention (e.g., compensation for poor customer service and experiences), loyalty programs (e.g., a show of appreciation), and sales account management (e.g., to retain business relationships). The gift transaction system may also be applied to one-to-many gifting applications, such as corporate gifting, which could be accessed through a merchant's web site, or through a corporate gifting marketplace website, which aggregates catalogs of multiple merchants. The aggregated catalogs can serve as a shopping catalog for other (corporate) gifting entry points through social media (e.g., LinkedIn), customer relationship manager (CRM) software (e.g., Salesforce), retail banking user applications, ride sharing applications, etc.

The web interface provided by the gift transaction system may be based on e-commerce or website content provided from a merchants' own websites. That is, in one embodiment, the gift transaction system may present a web interface on behalf of the merchant in a seamless manner—the web interface may have the look and feel of the actual merchant websites. In another embodiment, the web interface may merely include data from the merchants' website without the look and feel of the merchant websites. The sender may select a product, and its size, color etc., and provide recipient data, such as email address and shipping information. The sender may also send multiple gifts without each one being sent in a separate transaction with separate payment and emails. The gift transaction system may send a message to the recipient including a link to the gift transaction system. When the recipient clicks the link, the gift transaction system may allow the recipient to view the gift, decide if they want to change it for another product, color, or size, etc., and accept it. The gift transaction system may then coordinate payment from the sender and communicates with the merchant to ship the gift. Thus, users may make gift selections and purchases with the gift transaction system as if they were making purchases on the merchants' own websites.

FIG. 1 illustrates a computing system according to an embodiment of the present invention. The system presented in FIG. 1 includes client device(s) 102, merchant server(s) 104, transaction server 106, and network 108. Client device (s) 102 may comprise computing devices (e.g., desktop computers, television devices, terminals, laptops, personal digital assistants (PDA), cellular phones, smartphones, tablet computers, e-book readers, smart watches and smart wearable devices, or any computing device having a central processing unit and memory unit capable of connecting to a network). Client device(s) 102 may also comprise a graphical user interface (GUI) or a browser application provided on a display (e.g., monitor screen, LCD or LED display, projector, etc.). A given client device may vary in terms of capabilities or features and include or execute an application to communicate content, such as, for example, textual content, multimedia content, or the like. A client device may also include or execute an application to perform a variety of possible tasks, such as browsing, searching, etc.

A client device may include or execute a variety of operating systems, including a personal computer operating system, such as a Windows, Mac OS or Linux, or a mobile operating system, such as iOS, Android, or Windows Phone, or the like. A client device may include or may execute a variety of possible applications, such as a client software application enabling communication with other devices, such as communicating one or more messages, such as via email, short message service (SMS), or multimedia message service (MMS), including via a network, as well as a social network, including, for example, Facebook, LinkedIn, Twitter, Pinterest, Snapchat, or Instagram, to provide only a few possible examples.

Merchant server(s) 104 may comprise electronic storefronts that may be used to facilitate online transactions. According to other embodiments, merchant server(s) 104 may also include customer care centers or loyalty and customer retention teams (collectively referred to herein as simply "customer care centers"). In another embodiment, merchant server(s) 104 may comprise sweepstakes or contest drawing entities. An electronic storefront (also commonly referred to as an e-commerce website) may enable various client device(s) 102 to access web pages that are designed and implemented to facilitate corresponding transaction operations, such as catalog pages, shopping bag pages, checkout pages, etc. Client device(s) 102 may include devices used by sender users to send gifts and devices used by recipient users to receive gifts. The merchant server(s) 104 may provide web pages that are configured to receive customer (e.g., sender and recipient) input and store data related to transactions and other electronic storefront operations in one or more databases.

Each of merchant server(s) 104 may include one or more web servers, application servers, and database servers. The web servers may serve web pages to client device(s) 102, maintain user sessions, receive user input data and user interface control selections from client device(s) 102, and forward the data to applicable business logic at the application servers. Web servers may be configured to interact with clients using the HTTP protocol (also HTTPS), typically over TCP/IP connections. Web servers may run applicable web server software, such as Apache or Microsoft IIS, as well as any other applicable web server software.

Application servers may include and execute software applications that implement business logic for the electronic storefront, as well as generating web pages (or otherwise generating scripting or other code used to dynamically build web pages). Data received from the web servers may be processed by the applications servers and stored to the database servers. Database servers may be configured to run applicable database server software for storing data relating to electronic storefront operations, including data relating to a customer database, catalog database, order database, and inventory database.

According to one embodiment, merchant server(s) 104 may provide users of client device(s) 102 with webpages where senders may be able to select multiple products to provide recipients with an assortment of products to choose from to receive as a gift via website integration component, such as a JavaScript widget that creates a shopping bag function and imports gift transaction functionality on top of the merchants' websites. Alternatively, users may be directed to webpages provided by transactions server 106 for selecting gifts to send. The shopping bag function may store a plurality of products for a gift as a user navigates a merchant website, either in a single session or potentially storing it on the user's machine for multiple sessions.

The website integration component may solicit sender and recipient information, such as name, email and/or physical address, phone number, a gift message, gift occasion, and billing information. At a certain point, such as once the products for a gift are selected and the sender and recipient information has been provided to the merchant server(s) 104, the website integration component may transmit details of the gift request to transaction server 106 to carry out a gift transaction. Transaction server 106 may send a link to the recipient that directs the recipient one of client device(s) 102 to transaction server 106 to facilitate the gift transaction.

Web pages may be provided by the transaction server 106 that presents the recipient with the products by transaction server 106, e.g., one-by-one to review, select, modify etc., and payment may be processed to the billing information upon completing acceptance of the gift. The web pages provided by the transaction server 106 may be based on e-commerce or website content with the look and feel of web pages provided by merchant server(s) 104 (i.e., a "merchant experience"). The transaction server 106 may retrieve or receive regular (e.g., daily or hourly) downloads of data from merchant server(s) 104. The data may include merchant credentials, analytics, product feeds (including e.g., inventory information, stock keeping units ("SKUs"), product descriptions, images, product attributes (e.g., sizes, colors, shapes, configuration, styles, etc.), customer information, and store categories (the latter allow the creation of relationships between products, e.g. women's running shoes). This becomes particularly important when displaying relevant swap options, and any other information necessary to provide a customer interface experience on behalf of the merchant in a seamless manner and to present a gift recipient with alternatives to a selected gift (e.g., other sizes, colors, shapes, configurations, styles, etc.). In one embodiment, a product application programming interface ("API") may be configured between the transaction server 106 and merchant server(s) 104 to retrieve the data from merchant server(s) 104 in real-time.

In one embodiment, a merchant may add a free gift (e.g., a sample) into a shopping bag to become part of the gift to the recipient. According to another embodiment, the transaction server 106 may support multi-sender gifts where a sender's shopping session is saved and transferred to another sender/user to add more products to the shopping bag. The shopping bag may be tracked and collated by the website integration component, and the recipient may see either who sent which product in the gift or that the entirety of the gift came from the collection of senders. Multi-sender gifts may be a feature that can be offered for events such as bar mitzvahs, weddings, or gift pooling. According to yet another embodiment, the shopping bag may be saved and used by the sender on another merchant website where the single shopping bag may be used to buy multiple products from different websites (e.g., clothes and flowers) in a single gift transaction, or sent to another sender to select another gift for the same recipient from additional websites and have all gifts be processed together in a single gift transaction. As such, senders may send multiple gifts from a variety of merchants without each product being sent in a separate transaction with separate payments and emails. In another embodiment, physical products from websites may also be bundled with digital goods, such as flowers paired with digital movie tickets or a digital music track. The transaction server 106 may also create one-to-many gifting, such as corporate gifting, that can be accessed through a merchant's web site or through a corporate gifting marketplace website, which aggregates catalogs of multiple merchants. The aggregated catalogs can serve as a shopping catalog for other (corporate) gifting entry points through social media, CRM software, retail banking user applications, ride sharing applications, etc.

Figure 2:
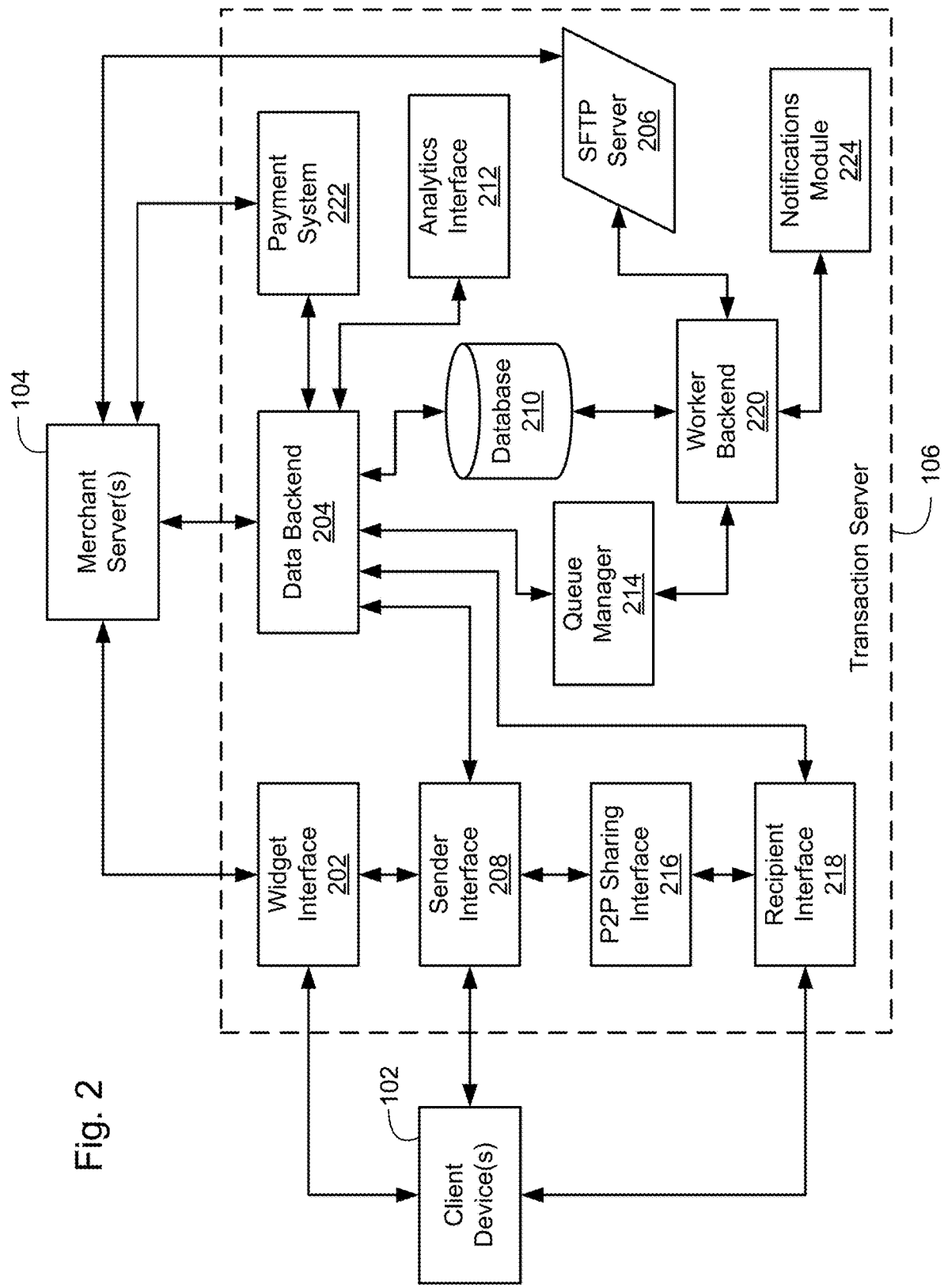
FIG. 2 illustrates another computing system according to an embodiment of the present invention.

Additional functionalities of the transaction server 106 are described in further detail with respect to the description of FIG. 2.

Servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. In an example embodiment, a server may include or have access to memory for storing instructions or applications for the performance of various functions and a corresponding processor for executing stored instructions or applications. For example, the memory may store an instance of the server configured to operate in accordance with the disclosed embodiments.

Network 108 may be any suitable type of network allowing transport of data communications across thereof. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine-readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client devices and servers may be encrypted using, for example, the Advanced Encryption Standard (AES) with a 128, 192, or 256-bit key size, or any other encryption standard known in the art.

FIG. 2 presents a dataflow diagram of gift transaction system according to an embodiment of the present invention. Widget interface 202 may comprise an interface for website integration components that may be embedded on a merchant's website (on merchant server(s) 104). A website integration component may be used to import gift transaction functionalities by, for example, adding a virtual shopping bag to a merchant's website, allowing senders using client device(s) 102 to add and remove merchant products from the virtual shopping bag, and adding a feature to create a gift transaction with the products in the virtual shopping bag. The website integration component may also include tracking information for accepting and paying a gift transaction by the sender and recipient. The widget interface 202 may temporarily store information about the contents of the shopping bag on the transaction server 106. Database 210 may comprise storage that contains merchant information, merchant product data, user data, and transaction data. Data backend 204 may manage access and retrieval of data from the database 210. SFTP (Secure Shell File Transfer Protocol) server 206 may allow merchant to upload product feeds for the transaction server 106 to consume. The merchant server (s) 104 may upload product feeds to the SFTP server 206 so that worker backend 220 can synchronize product information in the database 210 with the product feeds.

Worker backend 220 may also manage background jobs such as sending notifications to users via notifications module 224. The notifications module 224 may send gift transaction messages to users, e.g., reminder to accept products or finalize incomplete transactions, or preparing exportable reports for analytics interface 212 users. Queue manager 214 may relay jobs from the data backend 204 to the worker backend 220. The queue manager 214 may check the jobs' status and take action accordingly. For example, if a job fails, it attempts to send it to worker backend 220 again.

Sender interface 208 may comprise an interface that allows senders of gifts on client device(s) 102 to create an assortment of products for recipients to choose from. The sender interface 208 may communicate with the data backend 204 to create orders for the products as gift transactions using data in database 210. Recipient Interface 218 may comprise an interface for recipient users on client device(s) 102 to review, customize and accept the products as gifts. The recipient interface 218 may communicate with the data backend 204 to facilitate the gift transactions by providing gift selection and delivery details data from the recipient users on client device(s) 102. According to one embodiment, the sender interface 208 may save a shopping bag or session of a first sender with widget interface 202 and transfer the shopping bag or session to additional senders to add more products to the shopping bag prior to sending to the recipient. The products may be tracked and collated by the shopping bag, and the recipient interface 218 may see either who sent which gift item or that the entirety of the gift transaction came from the collection of users.

Data backend 204 may create payment links that direct client device(s) 102 of gift senders to the merchant server(s) 104 for checkout (e.g., payment) of gift transactions. The checkout process may be handled by payment system 222. The payment system 222 may include an inventory system that checks the in-stock availability of a product accepted by a recipient before a sender enters their payment information to the merchant server(s) 104. The payment system 222 may request from data backend 204 merchant product data from database 210 to determine the in-stock availability. In-stock availability may also be checked in real-time directly from merchant server(s) 104 via an API call. The in-stock availability of products may be checked when adding products to a shopping bag, "unwrapping" a gift (or presenting product assortment to recipients), presenting product swaps, and before checkout of the products. The data backend 204 may also perform logical operations for analytics interface 212. The analytics interface 212 may comprise an interface for merchant server(s) 140 to access user, transaction and system performance data as well as insights into user behavior of client device(s) 102 (e.g., gift senders and recipients). According to one embodiment, the analytics interface 212 may provide recommendations for gifts and gift giving times based on shopping history and special occasions data.

P2P (peer-to-peer) sharing interface 216 may provide a communications mechanism for sending gift transaction messages electronically via email, text messages, and messages over social network platforms. A gift transaction message may include a link to a gift transaction created by a gift sender. The P2P sharing interface 216 includes social network capabilities for sending gifts and receiving them (for example, via sender interface 208 and recipient interface 218), inviting users to send gifts, and reminders to send gifts, through social network platforms. The P2P sharing interface 216 may call up (or initiate) native applications on client device(s), such as email client, text message editor, social network private message application or interface, or a web browser comprising functionality of any of the aforementioned native applications, and then embed a gift link within an informational editable textual message such as "here is a gift for you. Click the link to accept your gift and to let us [Name] know where to ship it."

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network may include individuals with similar experiences, opinions, education levels or backgrounds.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally. For example, a "social graph" or "socio-gram" may represent an entity in a social network as a node and a relationship as an edge or a link.

Figure 3:
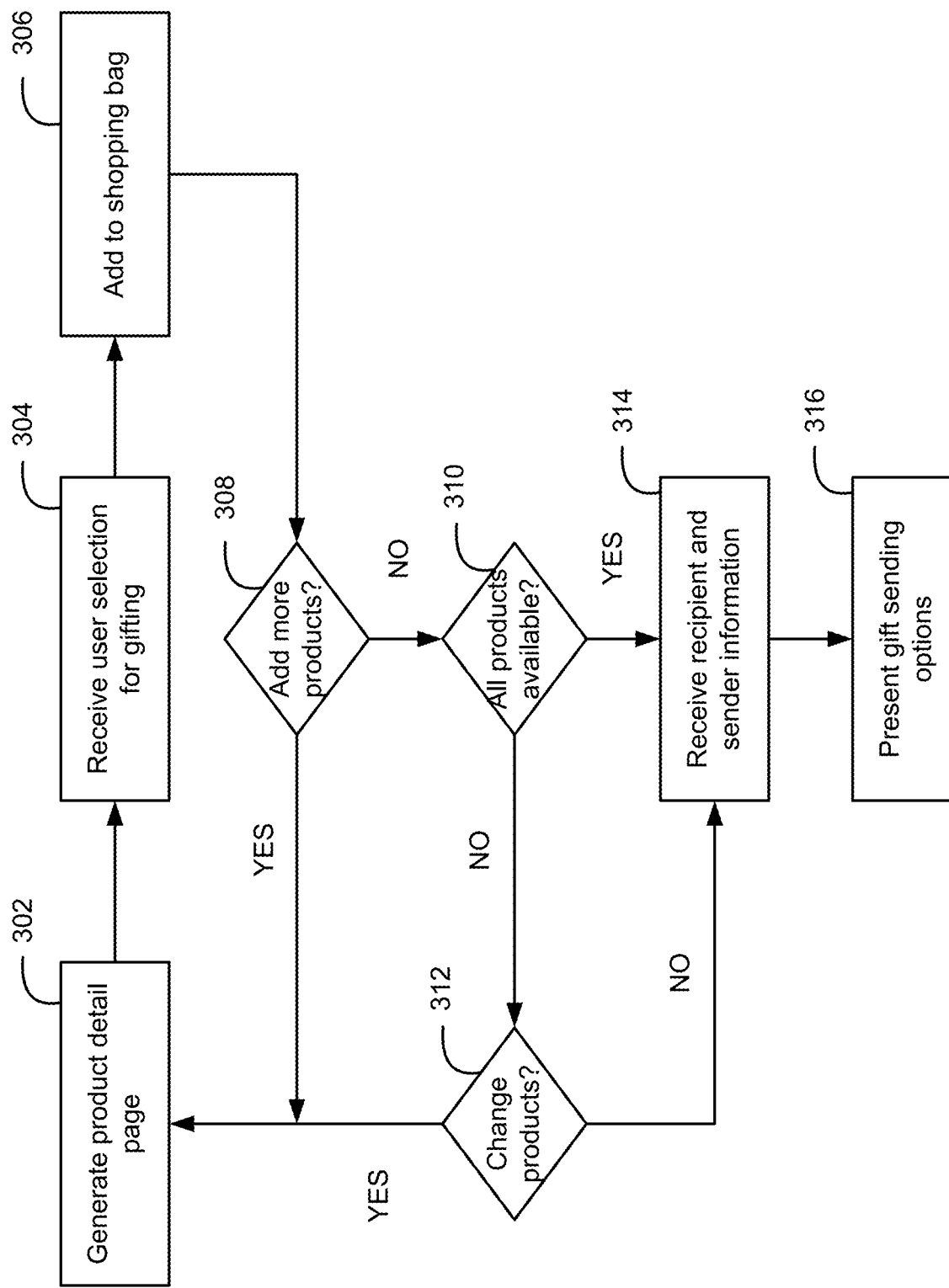
FIG. 3 illustrates a flowchart of a method for generating a gift transaction according to an embodiment of the present invention.

FIG. 3 presents a flowchart of a method for generating a gift transaction according to an embodiment of the present invention. A given merchant website may provide users with an option for gifting products to recipients where the recipients can choose, for example, the color, style, shape, configuration, and size of the gifts they wish to receive from senders. Senders of a gift transactions may be able to define a product assortment for recipients to select from. A catalog of products based on the product assortment may be generated and presented. A product detail page is generated for a given product in response to a user click or selection, step 302. The product detail page for the given product may include additional product description, product images, and available selections (e.g., color, style, shape, configuration, or size).

The system may receive a user selection of the given product for gifting, step 304. A shopping bag function may be created on top of the merchant's website for storing selected gift products as the sender navigates the website, either in a single session or for multiple sessions (e.g., on the sender's machine). The selected product is added to the shopping bag, step 306. The sender may have the option to add more products to the shopping bag, step 308. If the sender desires to add more products, the sender may be allowed to browse additional products and return to step 302 for each additional product.

Figure 4:
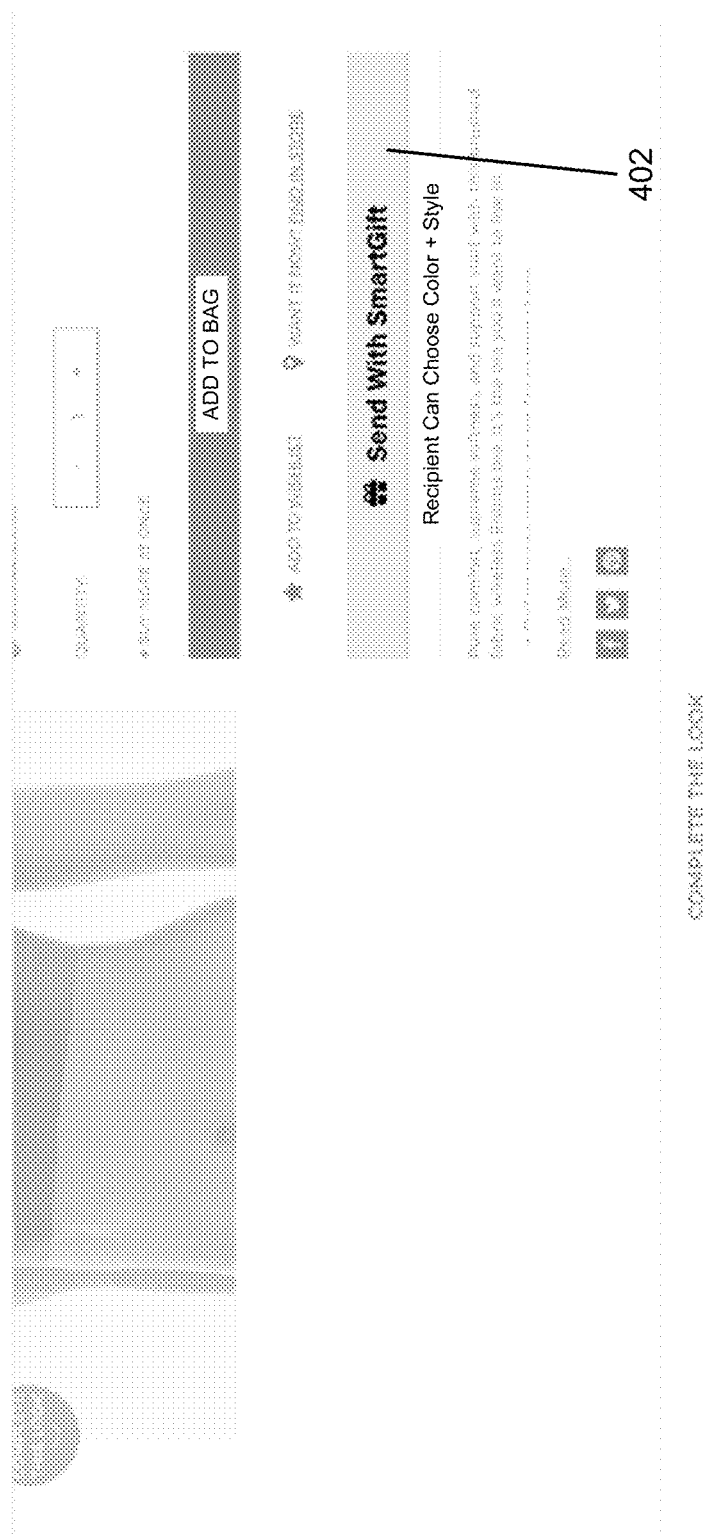
FIGS. 4 and 5 illustrate exemplary website integration components according to embodiments of the present invention.
Figure 5:
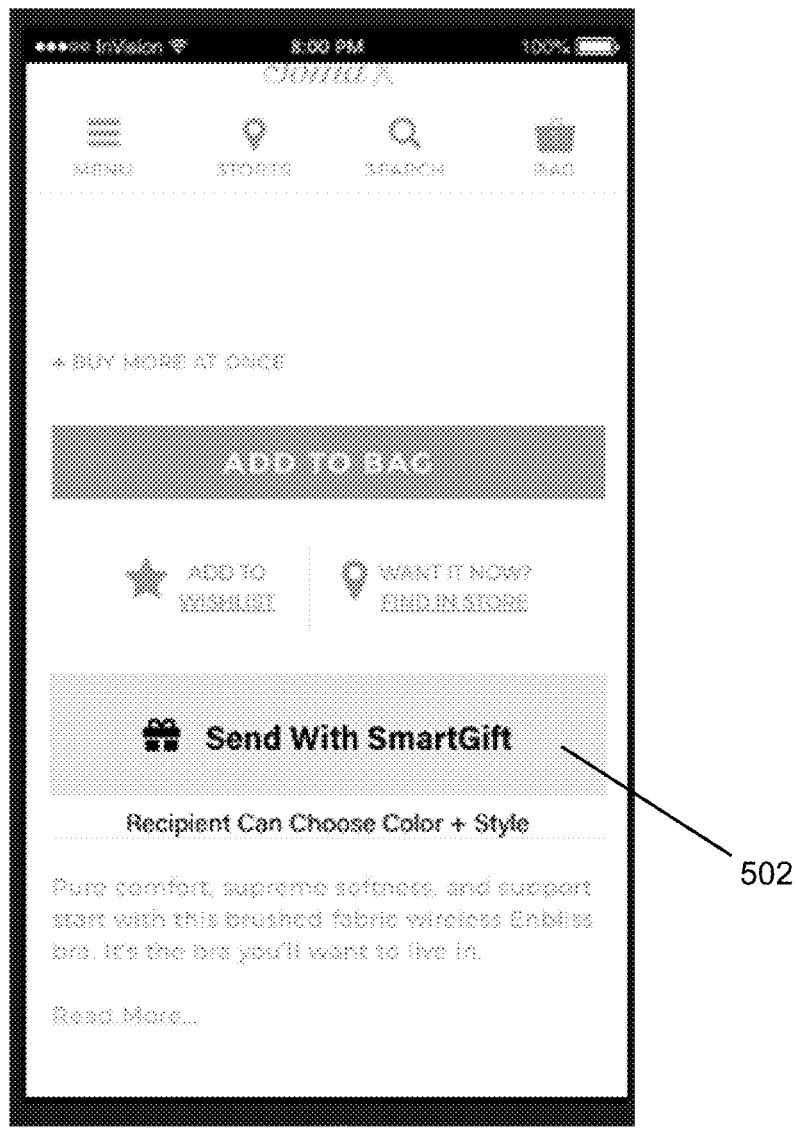
Figure 6:
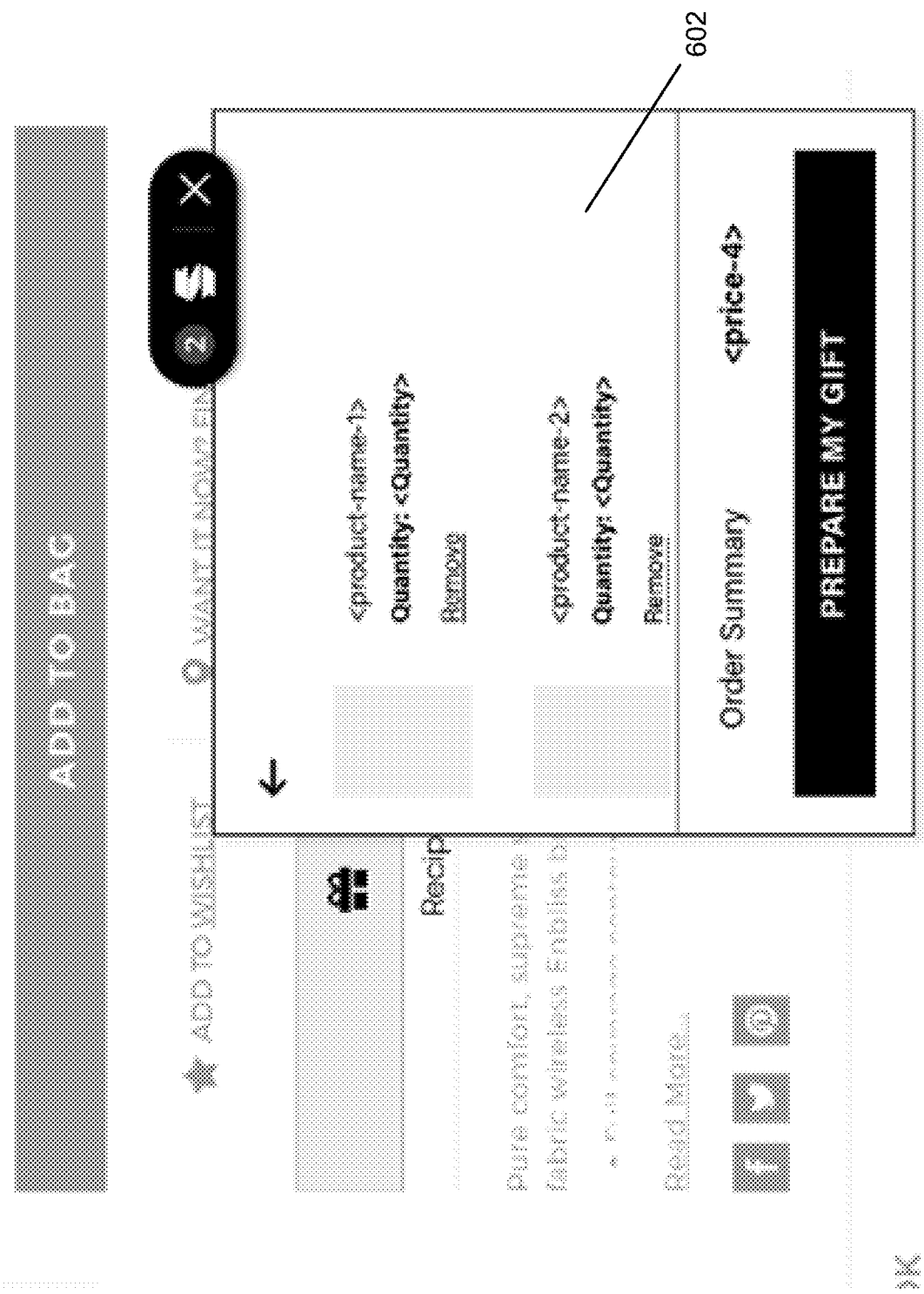
FIG. 6 illustrates an exemplary shopping bag interface according to an embodiment of the present invention.
Figure 7A:
FIG. 7A illustrates an exemplary interface for providing recipient information for the gift transaction system according to an embodiment of the present invention.
Figure 7A:
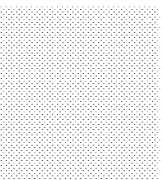
Figure 7B:
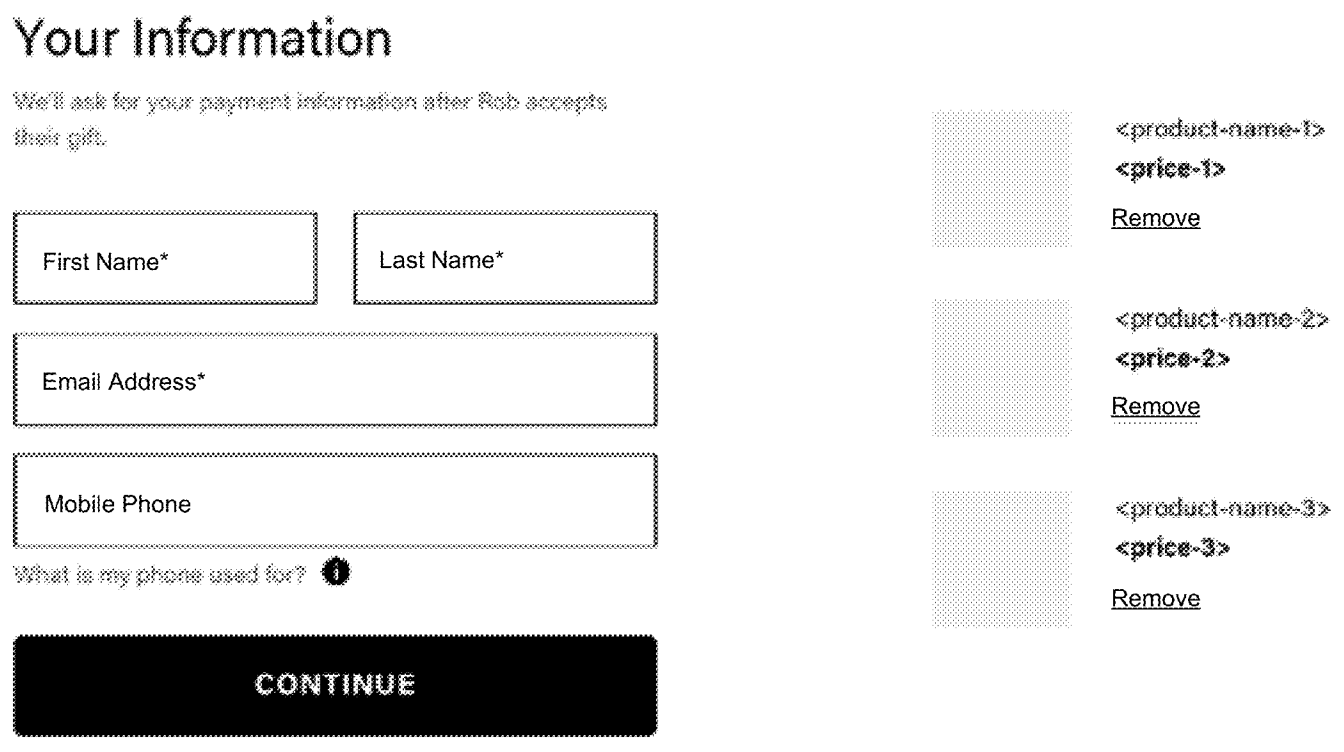

A website integration component may allow the sender to create an assortment of products in the shopping bag for a recipient to choose as a gift using button 402 in FIG. 4 (e.g., on a computer) or button 502 in FIG. 5 (e.g., on a mobile device). FIG. 6 presents an exemplary shopping bag according to an embodiment of the present invention. Upon selection, a virtual shopping bag 602 including selected products may be generated as gift options for sending to a recipient. The system may determine whether all the products in the shopping bag are available, step 310. If all the products are not available, the sender may be provided with the option to change products, step 312. Alternatively, the sender may be allowed to proceed with unavailable products given that the gift recipient would be able to choose alternate products from the shopping bag. If the sender does not change products, the system may proceed to receive recipient and sender information from the sender, step 314. FIG. 7A presents an exemplary interface for providing recipient information for the gift transaction system and FIG. 7B presents an exemplary interface for providing sender information to the gift transaction system in order to notify the sender of receipt and acceptance of the gift transaction. In addition to choosing the assortment of products in the shopping bag, the sender may also be able to set a gift price range, e.g., allow the recipient to choose product(s) from the shopping bag up to $150. According to one embodiment, the merchant may also add a free gift (e.g., a sample) into the shopping bag to become part of the gift transaction to the recipient.

Figure 8:
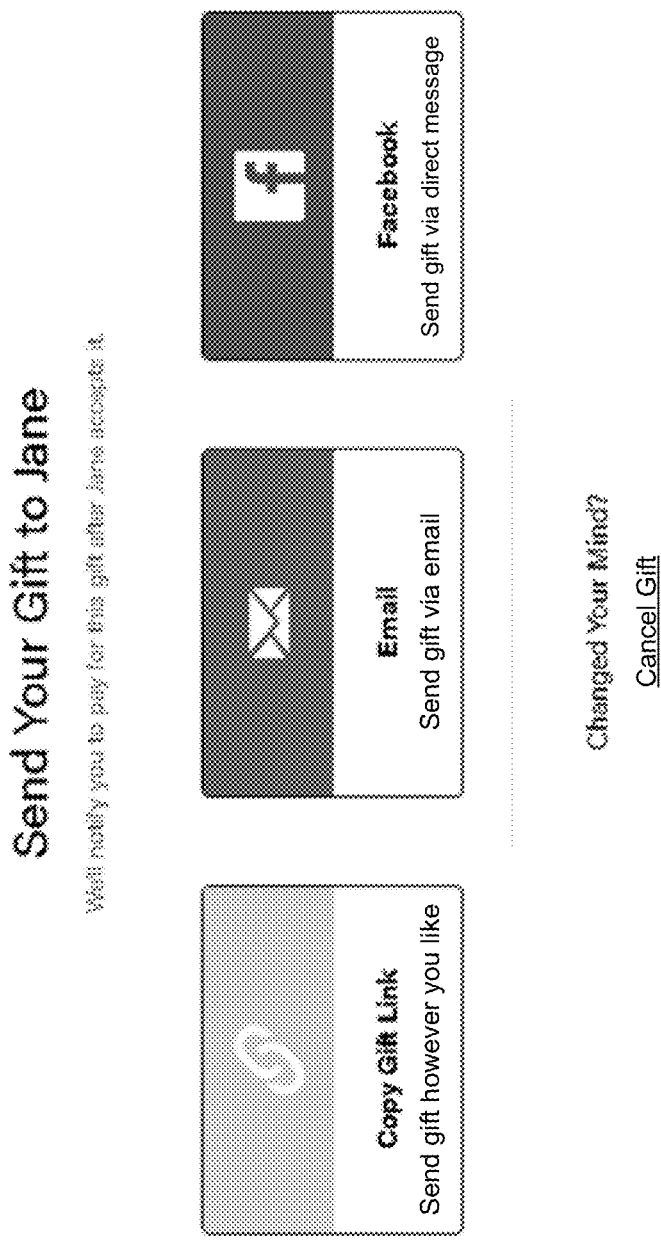
FIG. 8 illustrates exemplary gift sending options according to an embodiment of the present invention.

Once the recipient and sender information has been collected, the sender may be presented with gift sending options, step 316. The gift sending options may include sending the gift via a message, such as e-mail, text message, or on a social networking platform (as shown in FIG. 8). Selecting a given gift sending option may prompt a native application on a client device of the sender, e.g., email client, text message editor, social network private message application or interface, browser, etc., to generate an editable message embedded with a gift link that a recipient can click to navigate to a gift selection webpage or interface. The system may send the link to the recipient who may then follow the link to be presented with products in the gift transaction one-by-one to review, modify, and accept, etc. Alternatively, the system may generate a link to the gift transaction that may be copied by the sender for distribution using other communication systems. According to another embodiment, the system may support multi-sender gift transactions where a shopping session is saved and transferred to another sender to add more products to the shopping bag prior to sending to the recipient. The products may be tracked and collated by the shopping bag, and the recipient may see either who sent which gift product or that the entirety of the gift transaction came from the collection of users.

Figure 9:
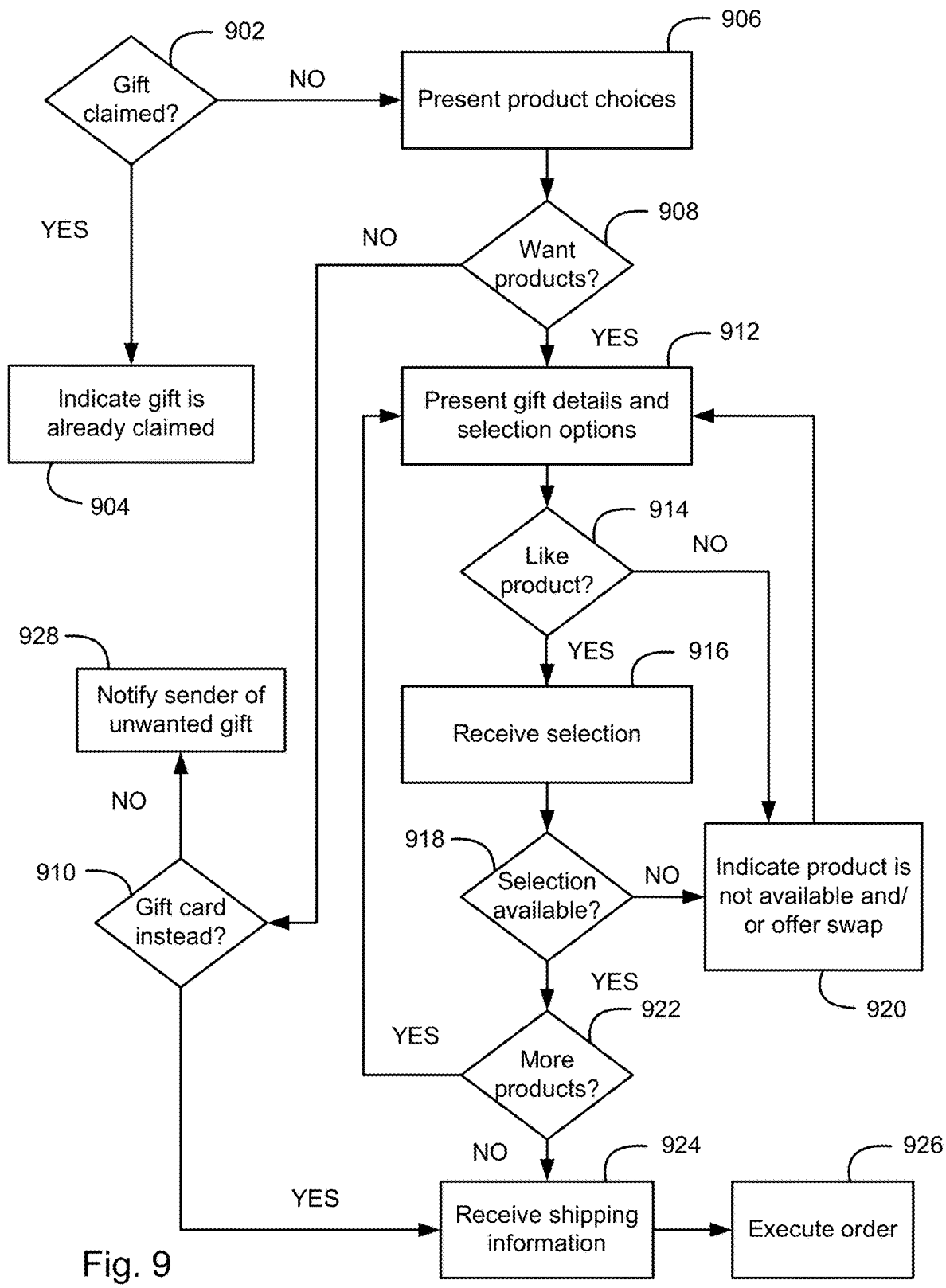
FIG. 9 illustrates a flowchart of a method for accepting a gift transaction according to an embodiment of the present invention.

FIG. 9 presents a flowchart of a method for accepting a gift transaction according to an embodiment of the present invention. A recipient may receive a link sent by a sender of a gift transaction. The link may direct the recipient to a gift selection interface. Upon accessing the link, a determination is made whether the gift transaction has been claimed, step 902. If the gift transaction has already been claimed, the recipient may receive an indication of such, step 904.

Otherwise, the recipient is presented with product choices, step 906. The product choices may comprise an interface including a summary of a product assortment a sender has chosen for a gift transaction to the recipient. According to another embodiment, the product choices may include cross-selling of products of same or lesser value, e.g., providing alternative product offerings. The gift transaction system may also generate upsells in the product choices at, e.g., original gift value plus x %, to induce a sale of more expensive products, upgrades, or add-ons with respect to products that were specified by the sender. The product choices interface may also include a "store categories" feed that provides relevant options for product selection by the recipient in addition to the products specified by the sender. For example, if the product choices include women's running shoes, the product choice interface may present a section that shows products under a "women's running shoes" category that may be selected by the recipient. In yet another embodiment, the gift transaction system may allow merchants to show products that they want to feature, e.g. newly launched product categories or products, on the product choices interface.

Figure 10:
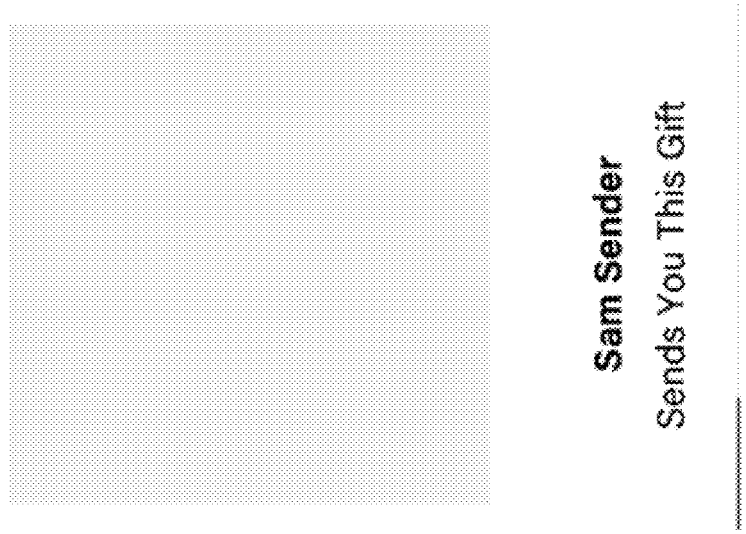
FIGS. 10 through 14 illustrate exemplary screens for gift product selection according to an embodiment of the present invention.
Figure 10:
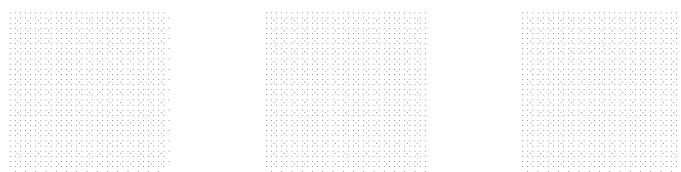
Figure 11:
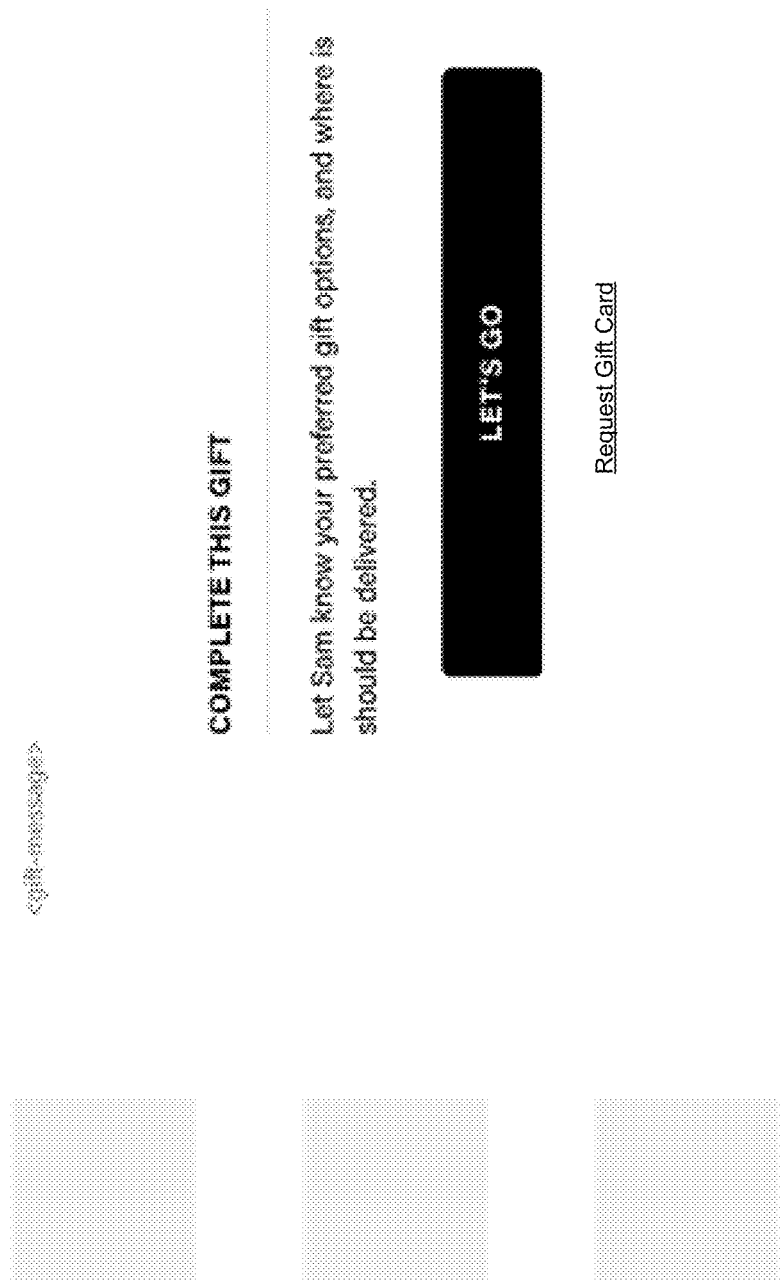

FIGS. 10 and 11 present exemplary screens for product selection. The recipient may be asked if they want the gift products, step 908. If not, the recipient may be offered a gift card instead, step 910. If the gift card offer is refused, the sender of the gift transaction may be notified of an unwanted gift, step 928. Acceptance of the gift card may cause the system to solicit and receive shipping information (or electronic delivery information, such as an email address or phone number, e.g., for a digital gift card) for the recipient, step 924. The system may then proceed to execute an order for the gift card, step 926. According to another embodiment, the recipient may be able to re-designate the gift as a gift to another recipient. The gift transaction may be transferred to a new recipient by the gift transaction system via a new link. The sender of the gift transaction may be sent a message and asked to authorize the regift.

Figure 12:
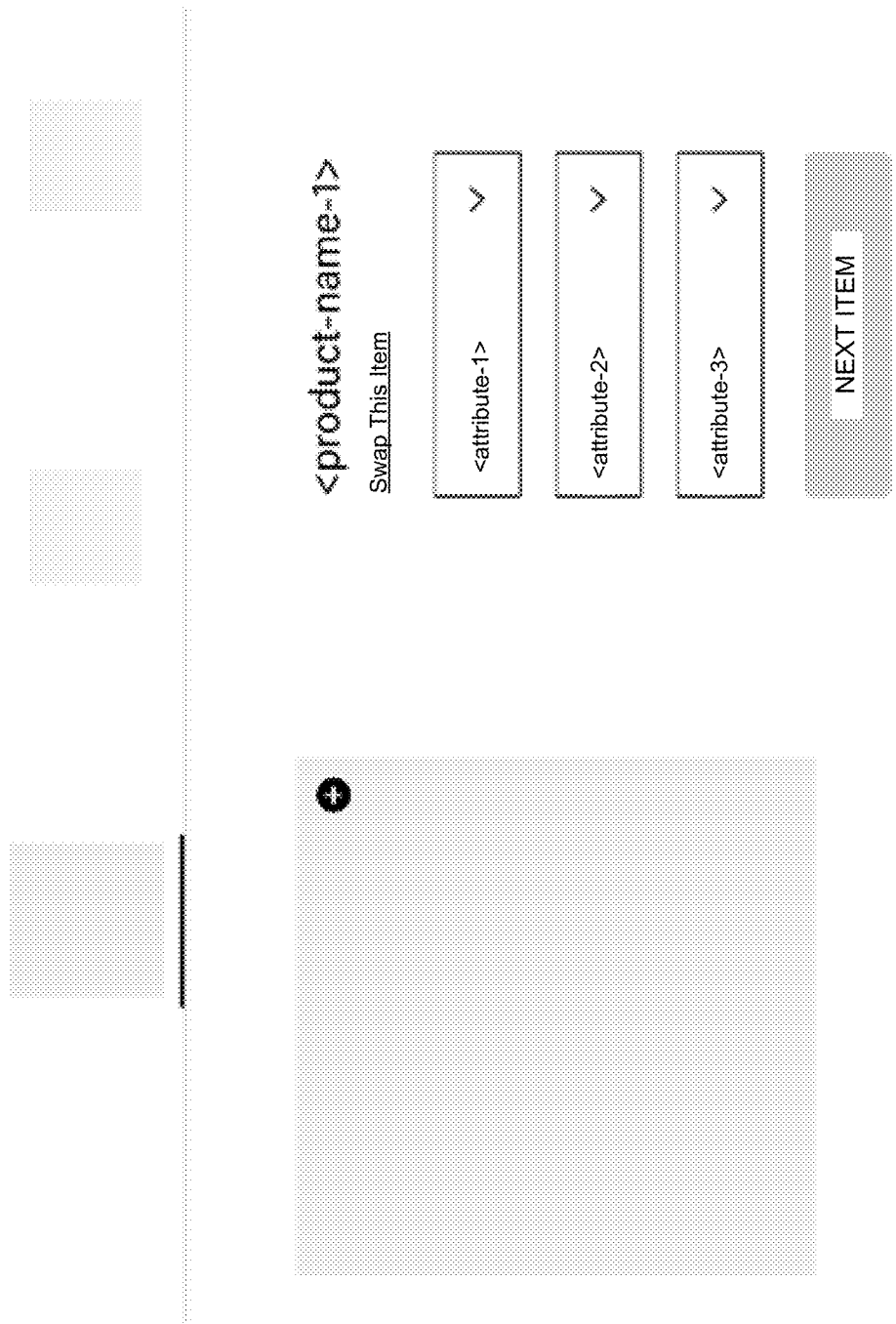
Figure 13:
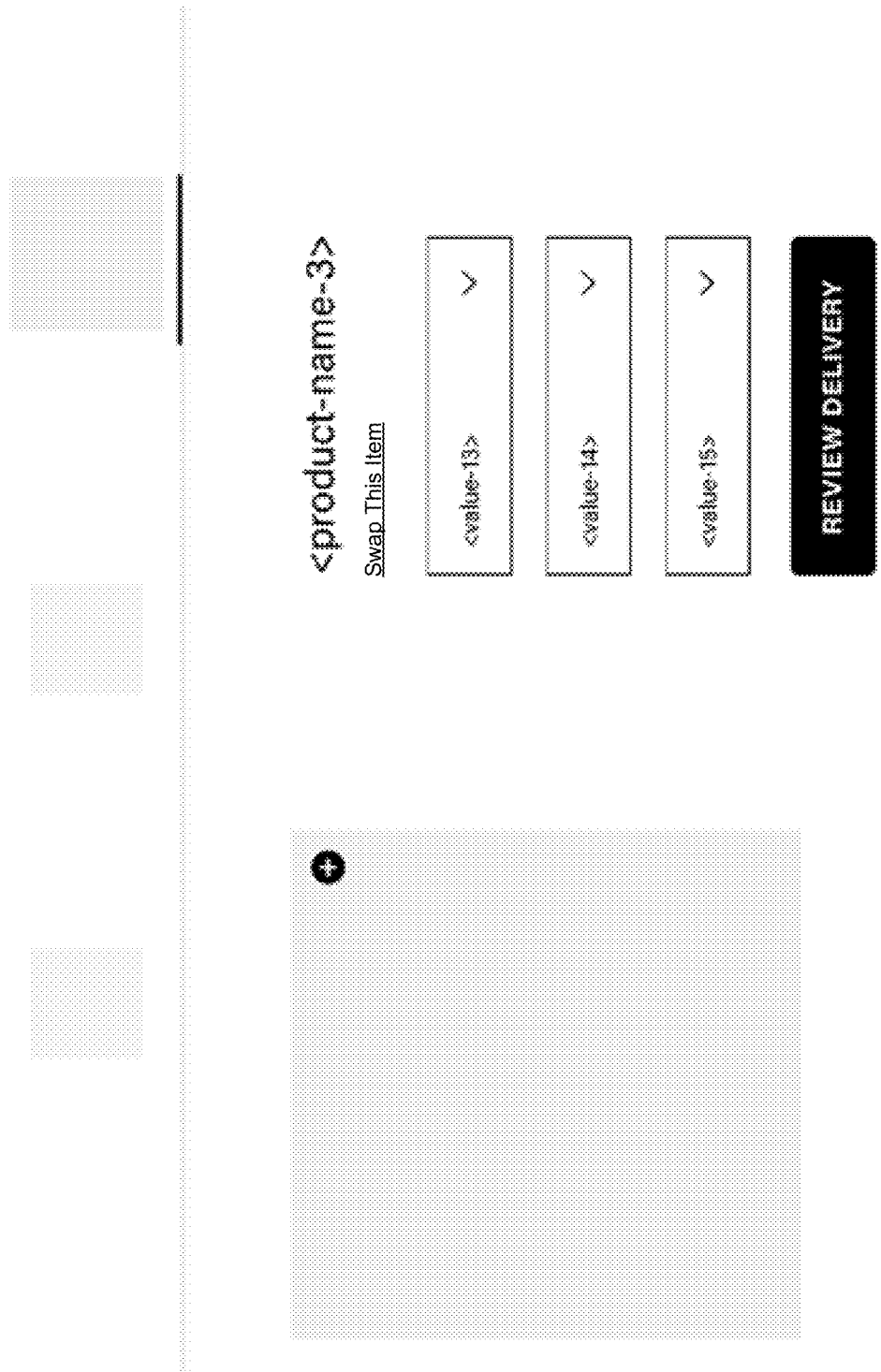

Referring back to step 908, if the recipient wants the gift products, gift product details and selection options are presented, step 912. FIGS. 12 and 13 present exemplary screens of gift selection options according to one embodiment. Gift selection options may include attributes of a gift product, such as size, color, shape, configuration, and style. The recipient may indicate whether they like a given product, step 914. The desired product indication may include a specification of values for attributes of the given product.

Figure 14:
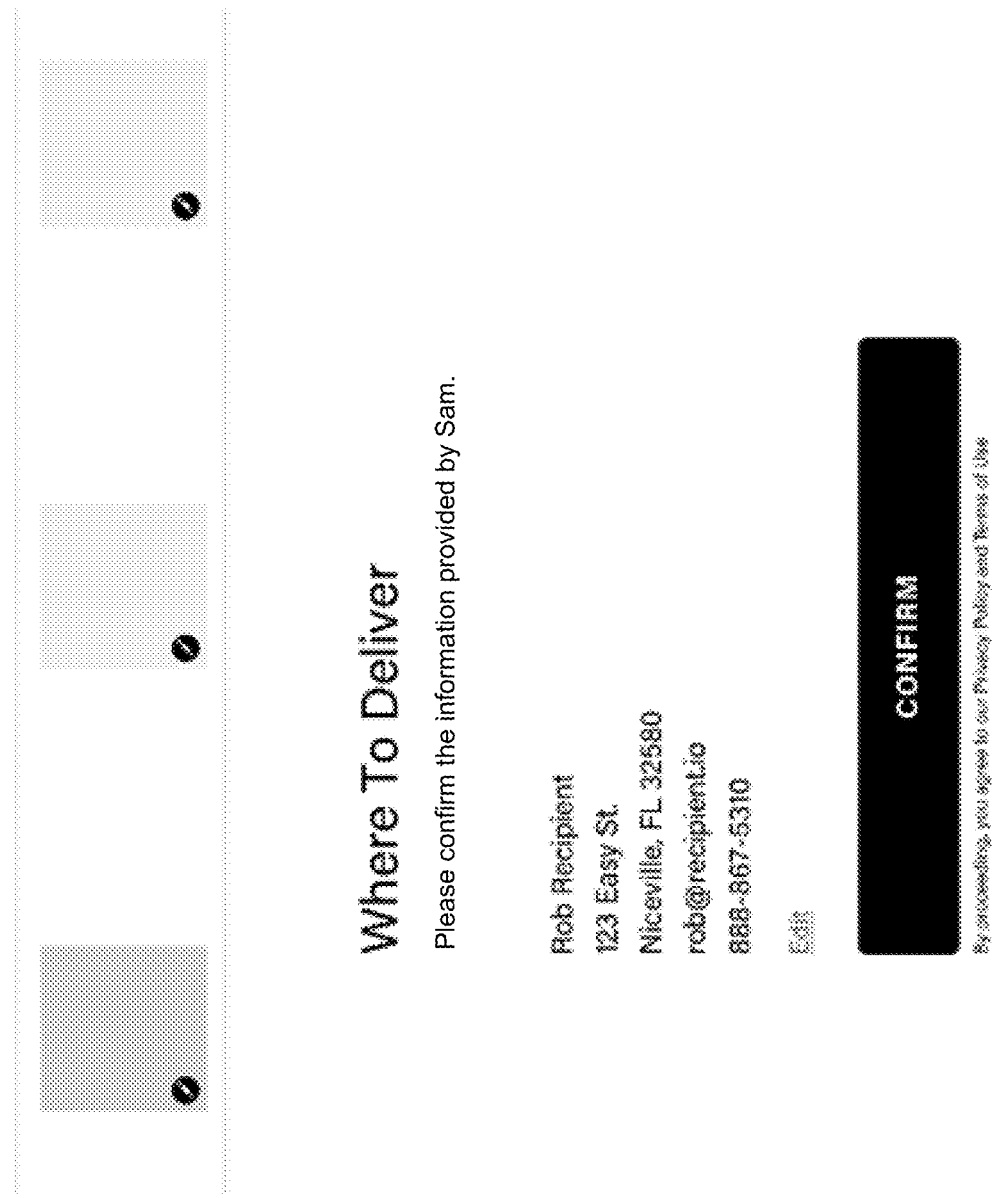

If a product is not desired or if the system receives a selection from the recipient (step 916) and a selection is not available (step 918), the system may indicate the product is not available and/or offer to swap the product for another product, step 920. The recipient may be presented with additional options in step 912. The additional options may include products from a same store category, alternative product offerings from cross-selling or upselling, or relevant swap options based on data collected (previous transactions on the gift transaction system) from the same recipient or other recipients. At step 918, if a selection received from the recipient is available, the system may proceed to determine whether there are more products in the gift transaction, step 922. If there are more products, the system may return to step 912. Otherwise, if there are no more products left for selection in the gift transaction (FIG. 13), the system may proceed to receive shipping information, step 924, as illustrated in FIG. 14, and execute an order for the gift transaction, step 926.

Figure 15:
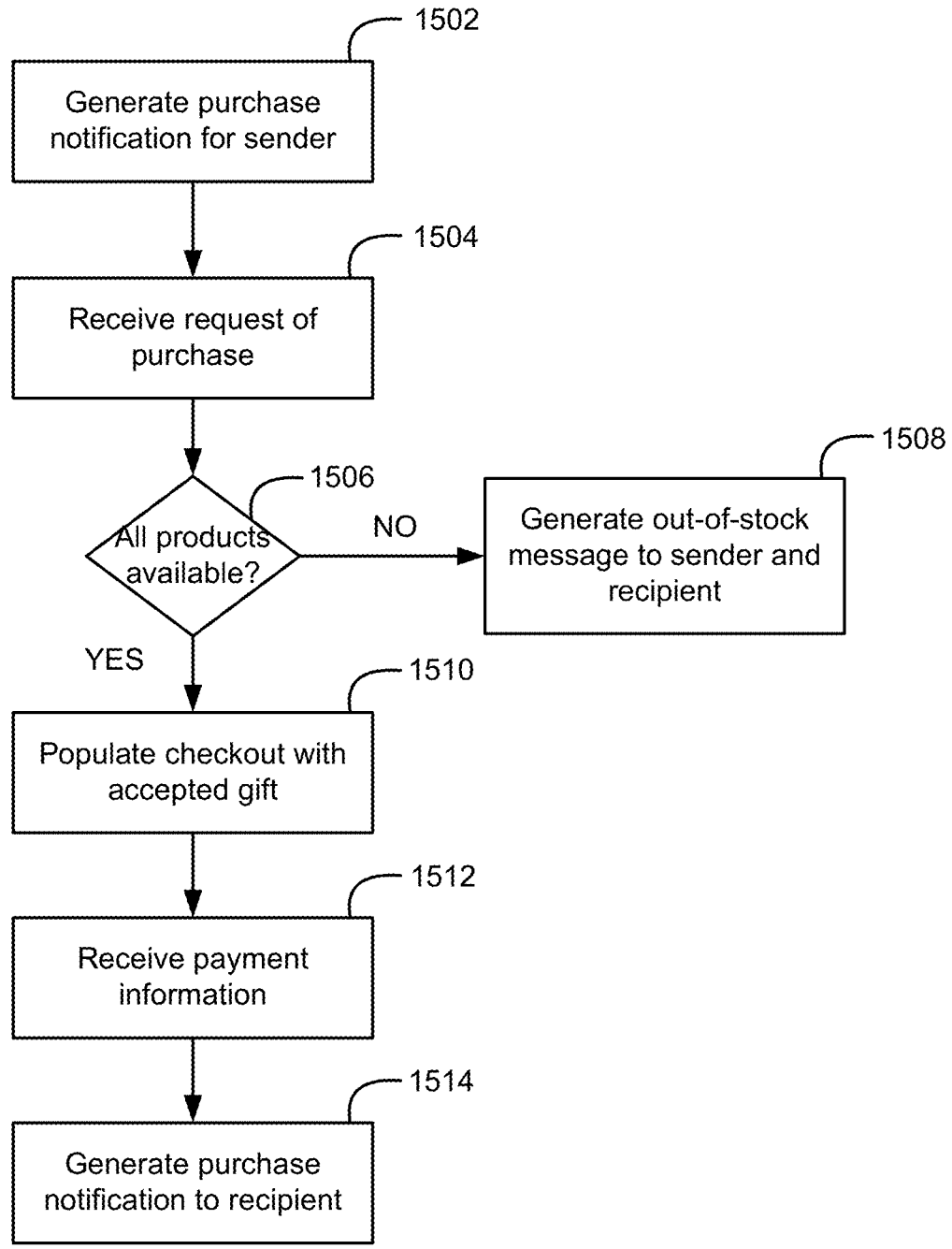
FIG. 15 illustrates a flowchart of a method for completing a gift transaction according to an embodiment of the present invention.

FIG. 15 presents a flowchart of a method for completing a gift transaction according to an embodiment of the present invention. Upon completing product selection by the recipient, a purchase notification is generated for the sender, step 1502. The purchase notification may comprise a message including a link to a checkout interface for completing the gift transaction between the sender and recipient. According to one embodiment, the checkout interface may include a product detail page(s) of the selected product(s) and shipping information collected from the recipient while accepting the gift. The product detail page may be embedded in a SMS or an email that is sent to the sender. For example, an email may be generated with product information and a payment link. Alternatively, the email may be generated with the product information and a link to a merchant's product display page and a shipping address page. The system may also send a SMS if the sender has provided a phone number while creating the gift transaction. The sender may be asked to opt in to receiving such messages.

The system receives a request of purchase from the sender, step 1504. The sender may select the link to indicate the request of purchase. The sender may be directed to a merchant website where a cart is populated with the selected product(s) and shipping information pre-filled. Alternatively, the sender may reference the information provided on the product detail page(s) and manually add the selected product(s) to a merchant cart and provide the shipping information. In another embodiment, the checkout interface may include a merchant cart that has been prepopulated with the products selected by the recipient and a section for the sender to manually input shipping information.

The system may determine if all the products selected for the gift transaction are available, step 1506. If one or more products in the gift transaction are unavailable, an out-of-stock message to the sender and recipient may be generated, step 1508. The out-of-stock message may include a link for the sender or recipient to select another product(s) in place of unavailable products in the gift transaction. If all the products in the gift transaction are available, the checkout interface is populated with the gift transaction accepted by the recipient, step 1510. The checkout interface may include details of the gift transaction, such as products selected by the recipient, and a total cost of the gift transaction that is due.

Payment information is received, step 1512. The sender may provide payment information to complete the gift transaction on the checkout interface. Purchase information from the checkout interface (i.e., products in merchant cart, shipping information, and payment information) may be submitted on the merchant website for ordering and fulfillment. The purchase information may be encoded in a payment link uniform resource location ("URL") that is retrieved by a merchant server to populate a merchant website cart with the products and information to complete a purchase. According to another embodiment, a unique identifier with the payment link URL may be transmitted to a merchant server which allows the merchant server to retrieve the purchase information from the gift transaction system using an API endpoint to populate a merchant cart with the products and information to complete a purchase. In yet another embodiment, the purchase information may be posted to an API endpoint that is associated with a merchant server. According to other embodiments, payments may be authorized and captured using a third-party payment processing system, such as Stripe or PayPal, or integrated with a merchant's preferred payment processing provider. When a gift transaction is accepted, payment may be automatically processed via such payment processing systems.

Alternatively, balances due may be recorded in a (charge) account at the gift transaction system and may be periodically settled with merchants (servers). When a recipient accepts a gift, the gift transaction system may submit an order through a merchant API, and the balance due may be recorded on a house account where the merchant is the account holder. Where third-party users are involved, such as corporate accounts, e.g. for gifts transactions purchased by American Airlines, 1-800-Flowers.com, Inc. can create an account for American Airlines and request payment periodically. Subsequent to receiving the payment information, a purchase notification to the recipient is generated, step 1514.

Figure 16:
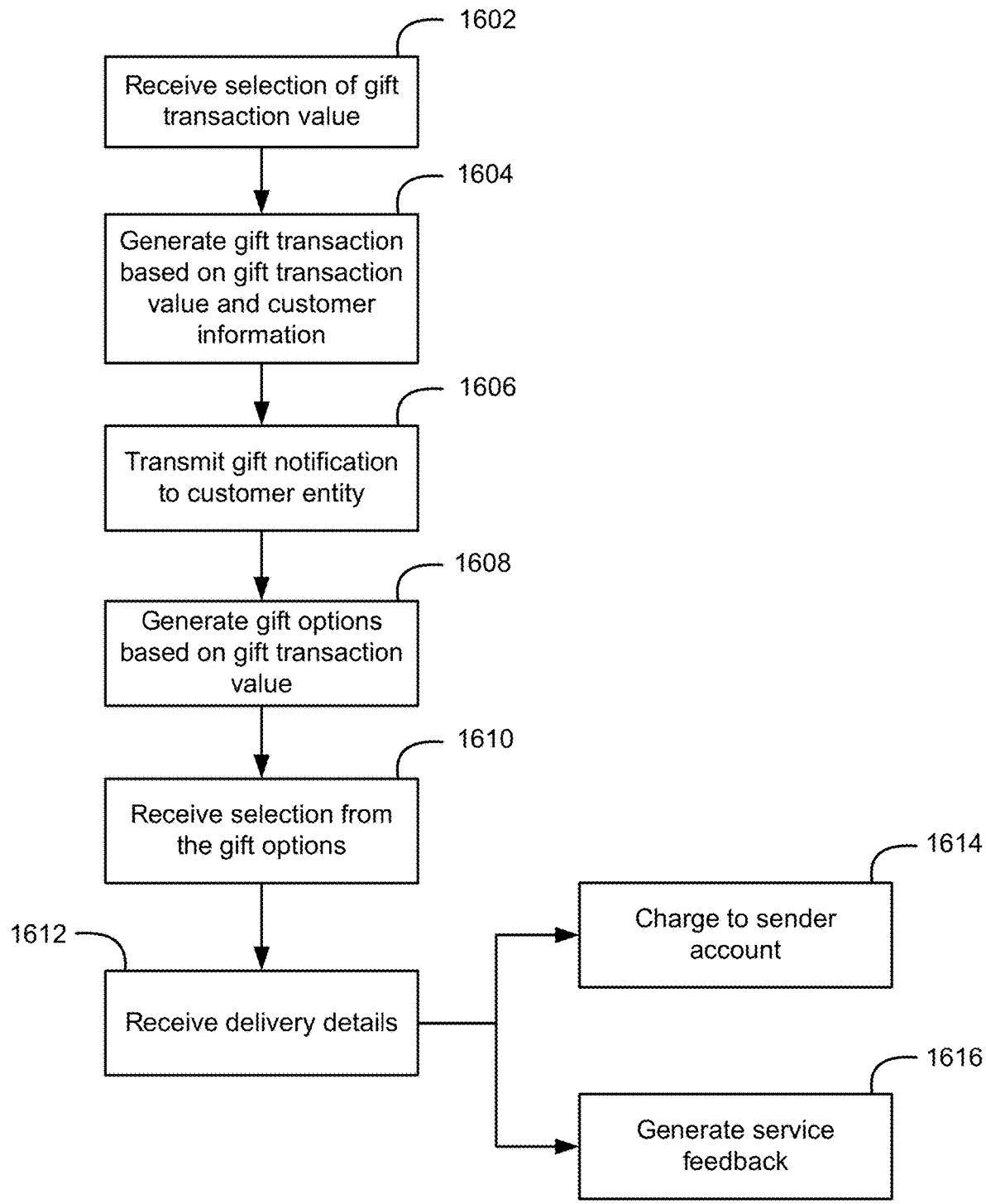
FIG. 16 illustrates a flowchart of a method for generating customer care gifts according to another embodiment of the present invention.

FIG. 16 presents a flowchart of a method for generating customer care gifts according to another embodiment of the present invention. The gift transaction system may further allow customer care centers to send a gift or a choice of gifts to a plurality of recipients using a contact list, either all at once or one at a time. Customer care centers may include call centers that may be tasked with rewarding customers who were unhappy with service they received. The call centers may resolve a customer issues through a replacement or a complimentary gift. Another example may include a conference center or trade show sending complementary gifts to attendees and speakers. Other examples may include representatives for customer retention (e.g., compensation for poor customer service and experiences), loyalty programs (e.g., a show of appreciation), and sales account management (e.g., to retain business relationships).

Figure 17:
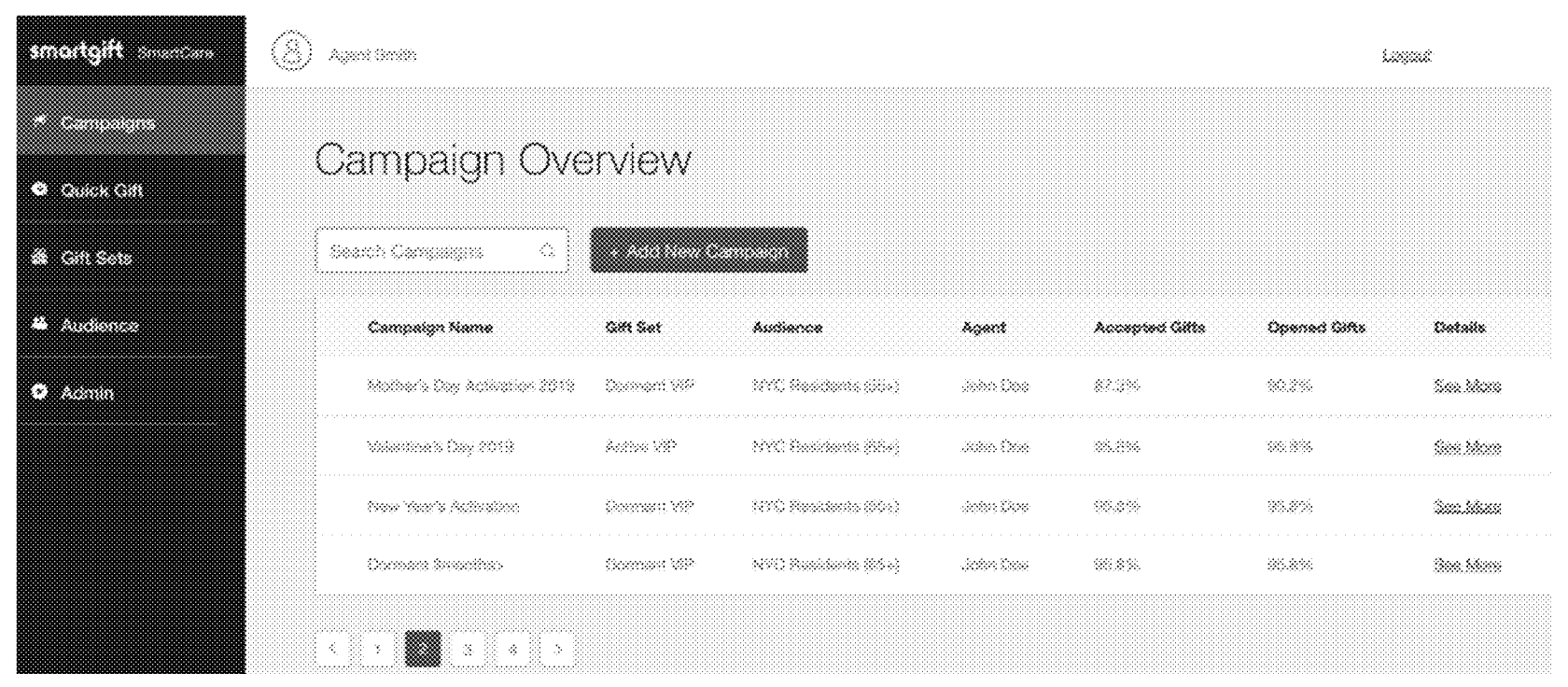

According to one embodiment, a gift module may be embedded to customer care center software. In another embodiment, the gift transaction system may provide a web-based service or portal to customer care center computers for generating customer care gifts. FIG. 17 presents an exemplary interface for viewing gift campaigns according to an embodiment of the present invention. A user may view, sort, filter, and search for campaigns by name, gift set, audience, an agent or creator of a gift or campaign, gift acceptance and opened status, or keyword(s).

Figure 18A:
Figure 18B:
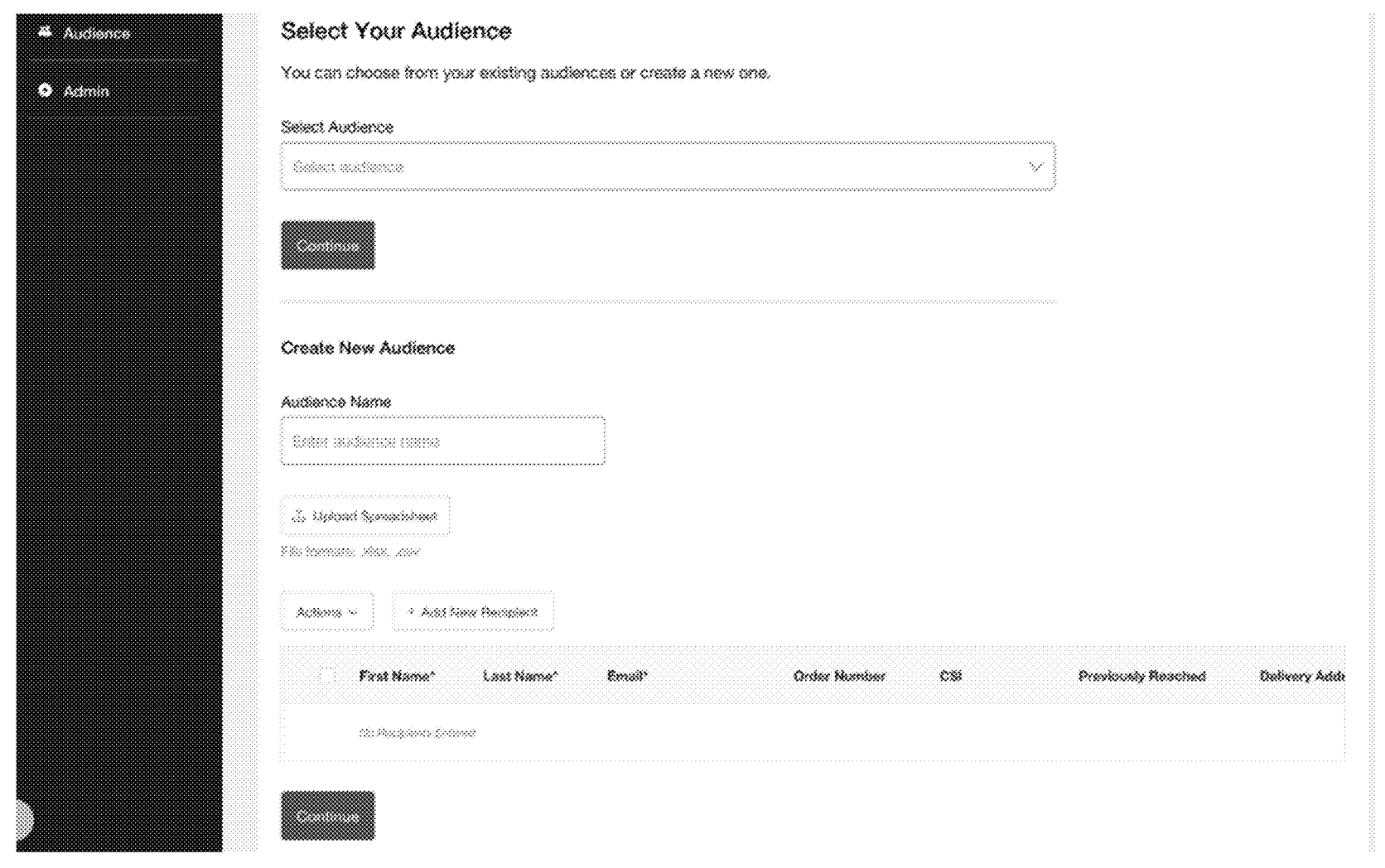

FIGS. 18A and 18B present exemplary data fields of a gift transaction according to an embodiment of the present invention. The customer care center computer can select a gift and recipient for processing similar to the processes described above for generating, accepting, and completing gift transactions, and optionally need not navigate to merchant sites. A selection of a gift transaction value is received, step 1602. In FIG. 18A, for example, the customer care center computer may specify a "gift set" including a preselected set of product assortment (e.g., flowers, candy, etc.) or a dollar-value amount for the gift transaction value. The customer care center computer may select existing gift sets or create a new gift set. A new gift set may be saved for subsequent use for other gift transactions. A given gift set may include a gift set name, gift value, and a gift message. According to one embodiment, the set of choices or dollar-value amount may be selected from or fulfilled with the customer care center's own products or services. In another embodiment, the customer care center computer may select a fulfillment partner or a related business to promote other lines of products or services. The customer care center computer may also submit a gift message to the customer on the gift set screen.

Figure 19:
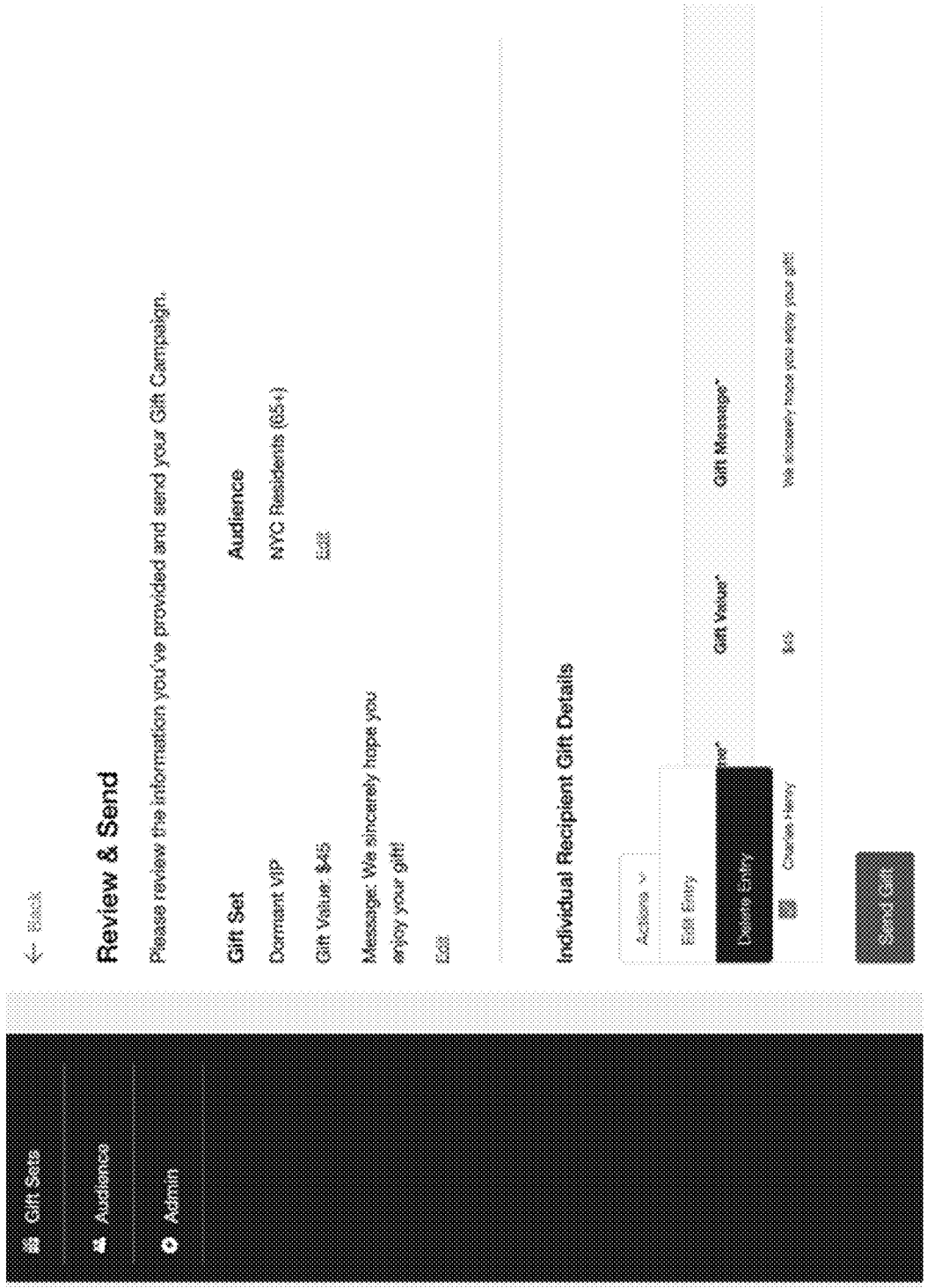

A customer care center computer may populate customer or "audience" information into data fields from a data source, as illustrated in FIG. 18B. The customer care center computer may comprise a client device or a server. The customer information may be loaded from, for example, CRM software, or from a merchant database. Customer information may include contact information, such as name, address, email address, phone number, etc. A user of the customer care center computer may review and edit the details the gift transaction prior to sending it, as illustrated in FIG. 19. A gift transaction is generated based on the gift transaction value and the customer information, step 1604.

Figure 20:
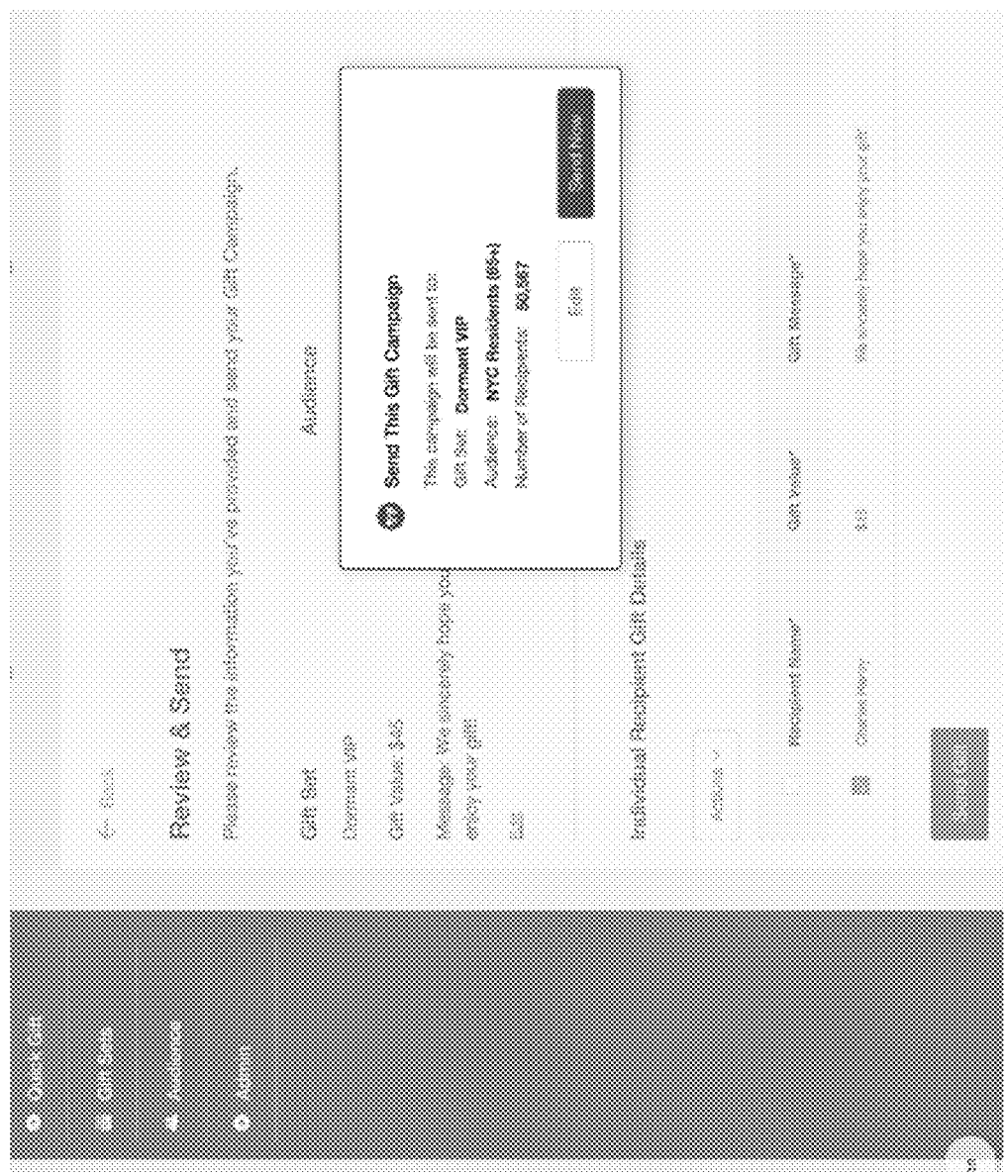

A gift notification is transmitted to a customer entity, step 1606. The customer entity may comprise an electronic account or address of a user that is accessible on a client device. The gift transaction may be transmitted or shared to the customer by, for example, email or text message. A confirmation message may be generated that indicates that the gift transaction will be sent to the customer entity. FIG. 20 presents an exemplary confirmation message according to an embodiment of the present invention. The gift transactions system may send or share gift transactions with customers as specified by the customer care center computer. Gift notification messages may be sent to or shared with the customer entity electronically via a text message, a branded system email, or through a social networking interface.

Figure 21A:
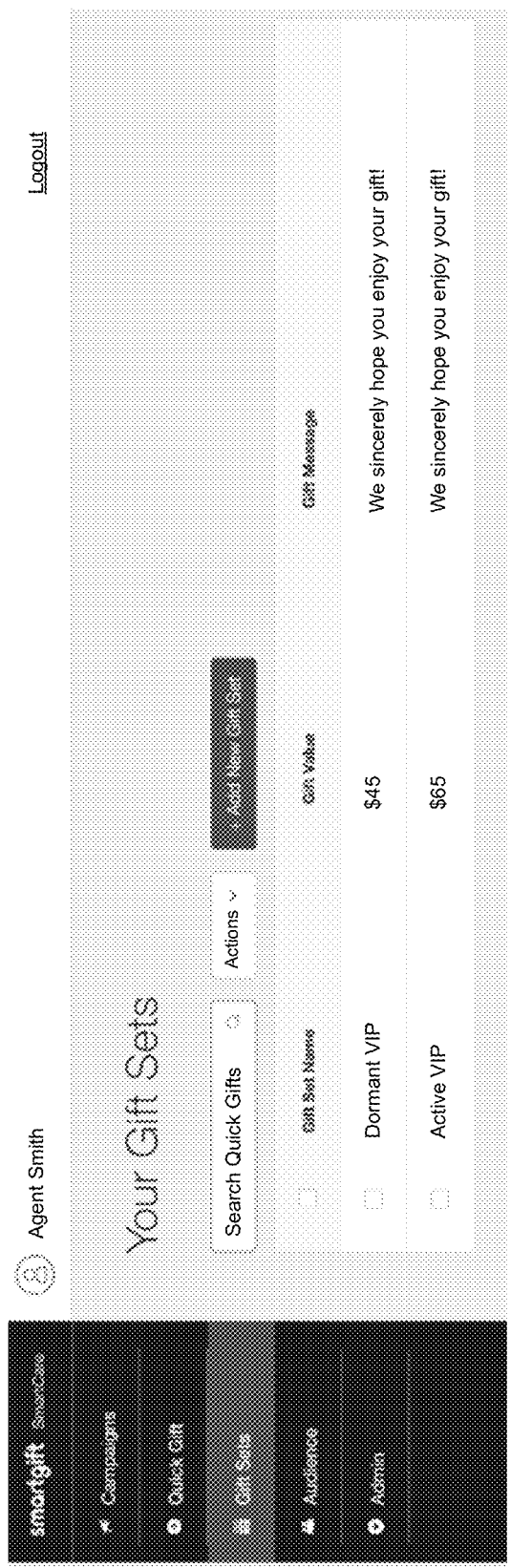
FIGS. 21A and 21B illustrate exemplary screens for viewing and creating gift sets according to an embodiment of the present invention.
Figure 21B:

Gift sets may also be created and stored for later use. FIG. 21A presents an exemplary screen for viewing existing gift sets. Gift sets may comprise templates for gifts that are recurring, for example, sent to multiple users or generic in nature. Gift sets may be created in advance and made available for selection when creating a gift transaction. Creating a gift set may include labeling the gift set with a name, e.g., by occasion, theme, or recipient, selecting a gift value, and providing a gift message, as illustrated in FIG. 21B. According to one embodiment, tags may be embedded into the gift message to personalize the gift message by automatically appending certain information, such as a recipient's first and last name, and a value of the gift.

Figure 22:
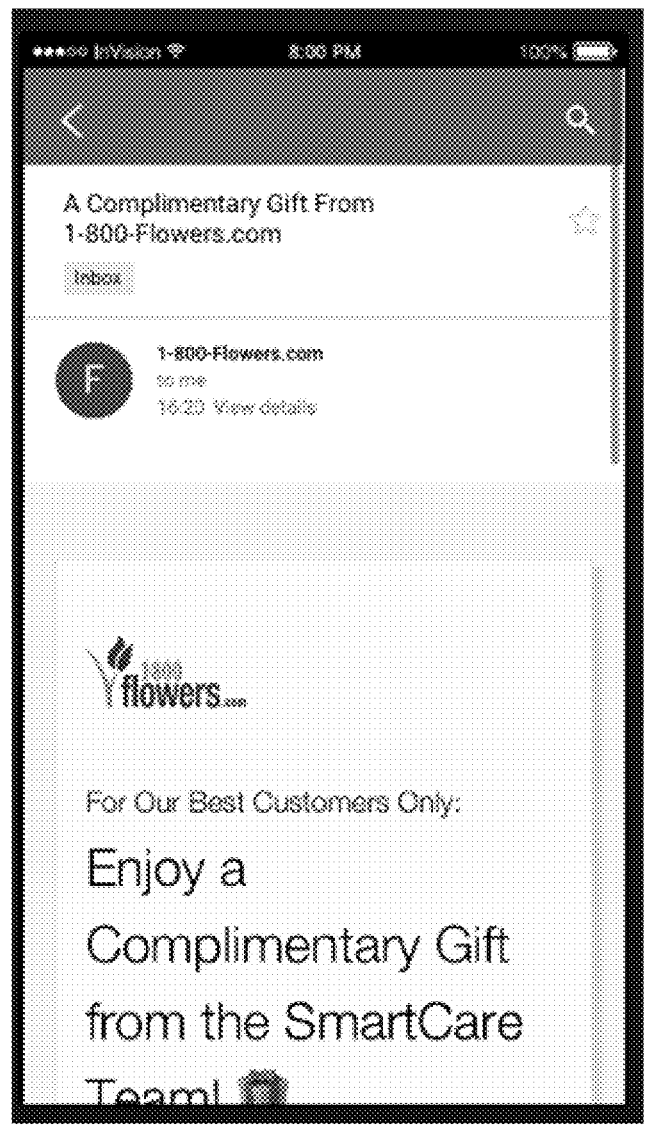
FIGS. 22 and 23 illustrate exemplary gift notification messages according to embodiments of the present invention.

FIG. 22 presents an exemplary gift notification message as a branded system email according to an embodiment of the present invention. The gift transaction system may generate the illustrated branded system email with the gift message, a logo or branding associated with the customer care center, and a link to redeem the gift transaction. The customer may view the branded email and access the link from a client device.

Figure 24:
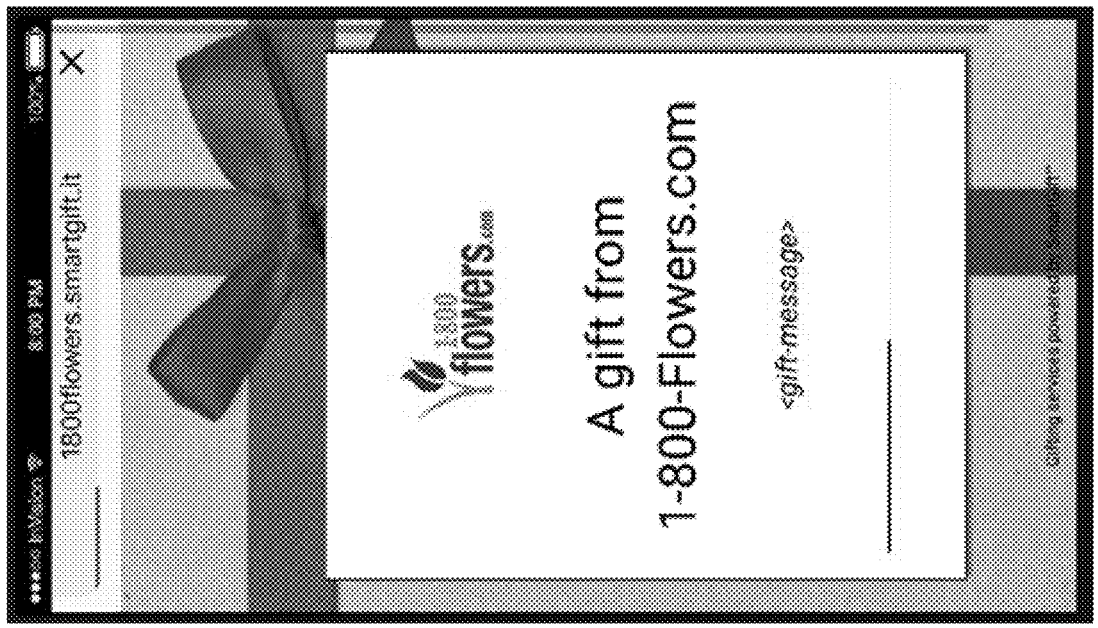
FIGS. 24 and 25 illustrate an exemplary fulfillment screen according to an embodiment of the present invention.
Figure 23:
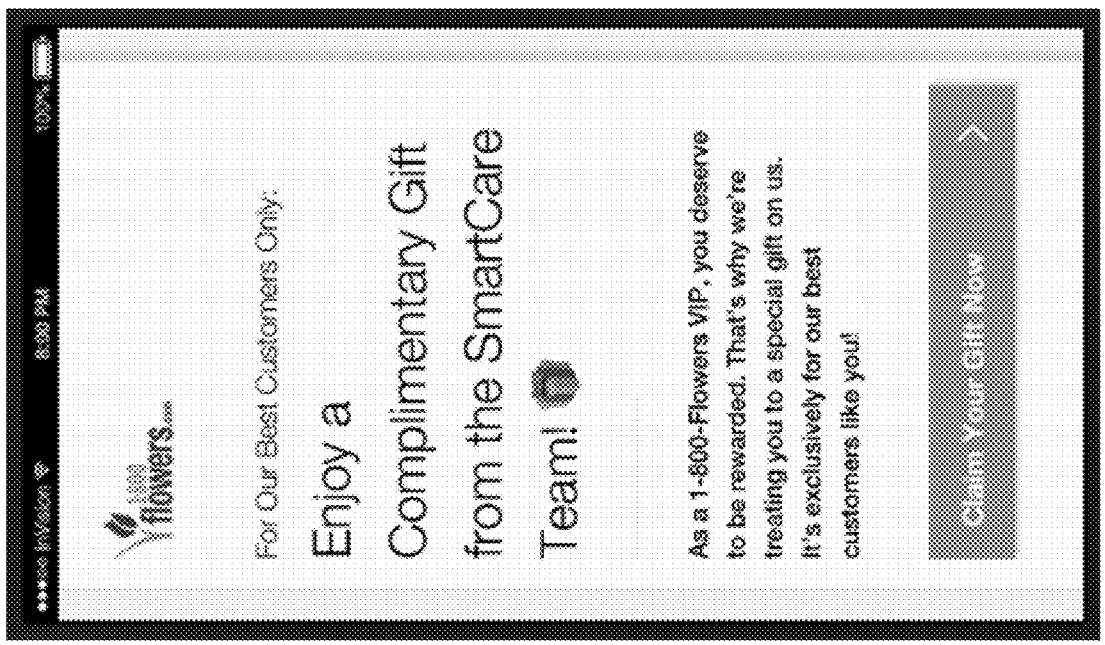
Figure 25:
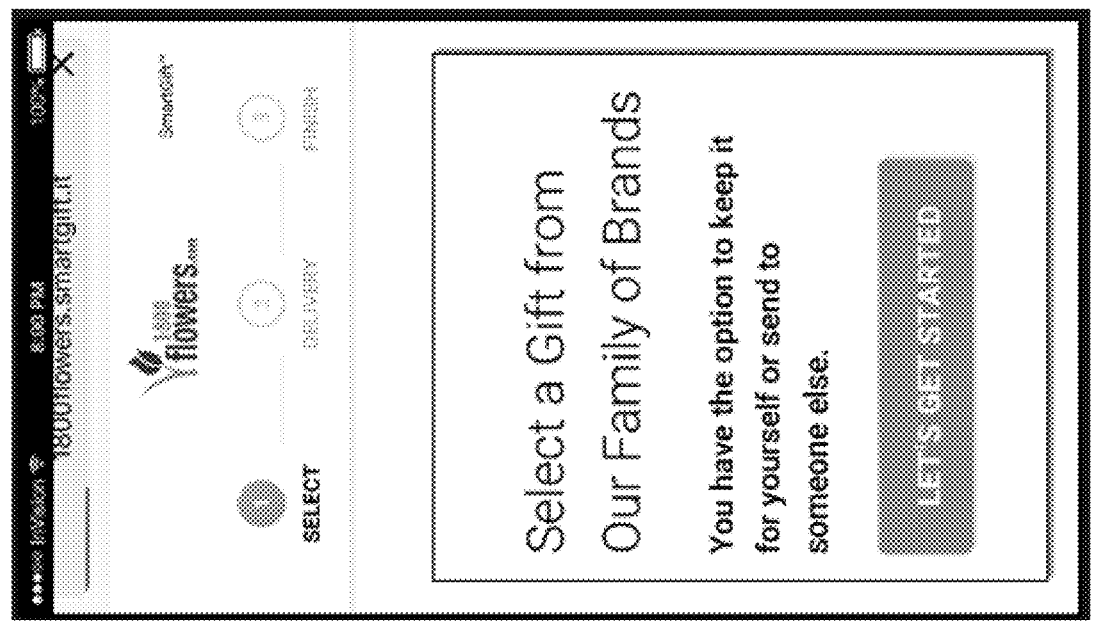

The customer may redeem the gift transaction by selecting the link in the gift message to direct their client device to a fulfillment server, as shown in FIG. 23. The fulfillment server may be either a server associated with the customer care center computer, a third-party merchant server (e.g., a fulfillment partner), or a gift transaction server operating on behalf the customer care center or the third-party merchant. FIGS. 24 and 25 present exemplary fulfillment screens according to an embodiment of the present invention. The customer entity may be directed to a website including a gift message (FIG. 24) and a screen, as illustrated in FIG. 25, that informs the customer that they may proceed to select any gift from a product assortment and the gift may be kept by the customer or sent to someone else.

Figure 26:
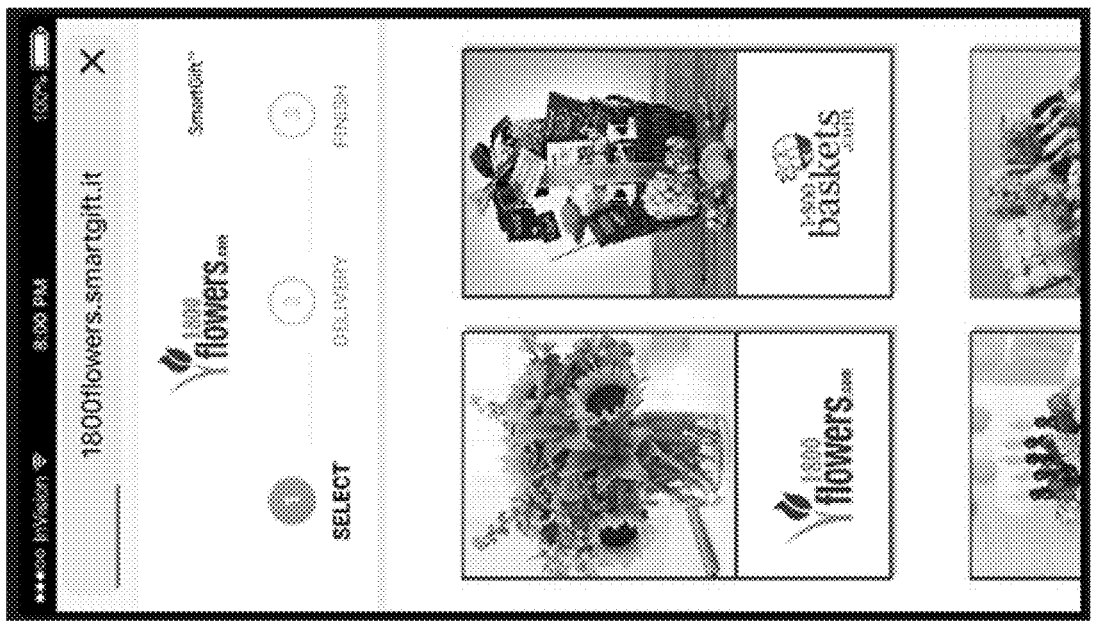
FIGS. 26 and 28 illustrate exemplary screens for selecting gift options to redeem according to an embodiment of the present invention.
Figure 28:
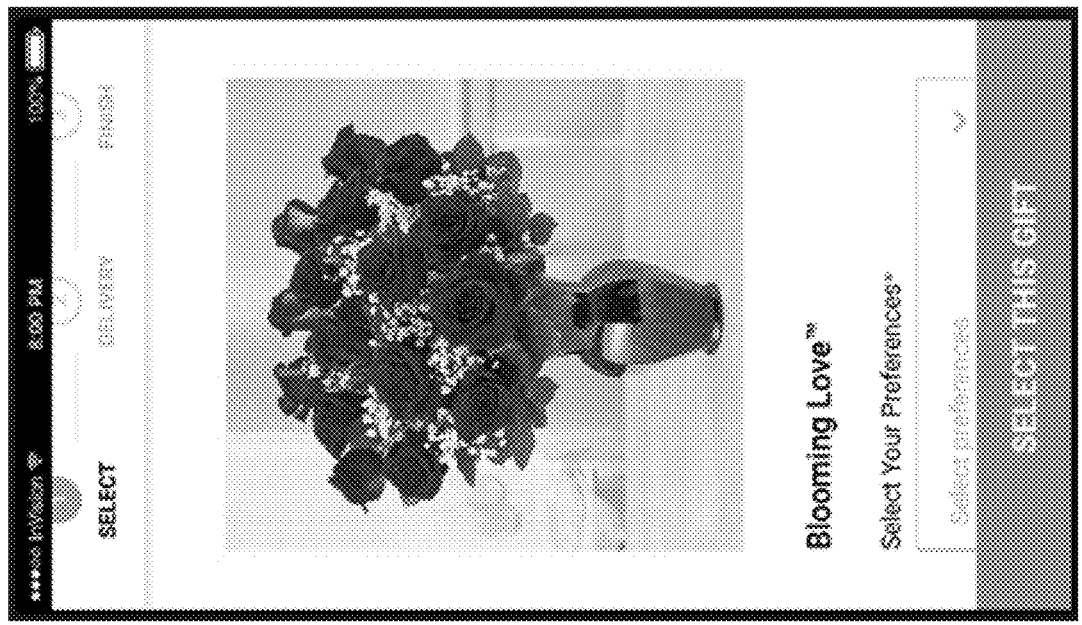
Figure 27:
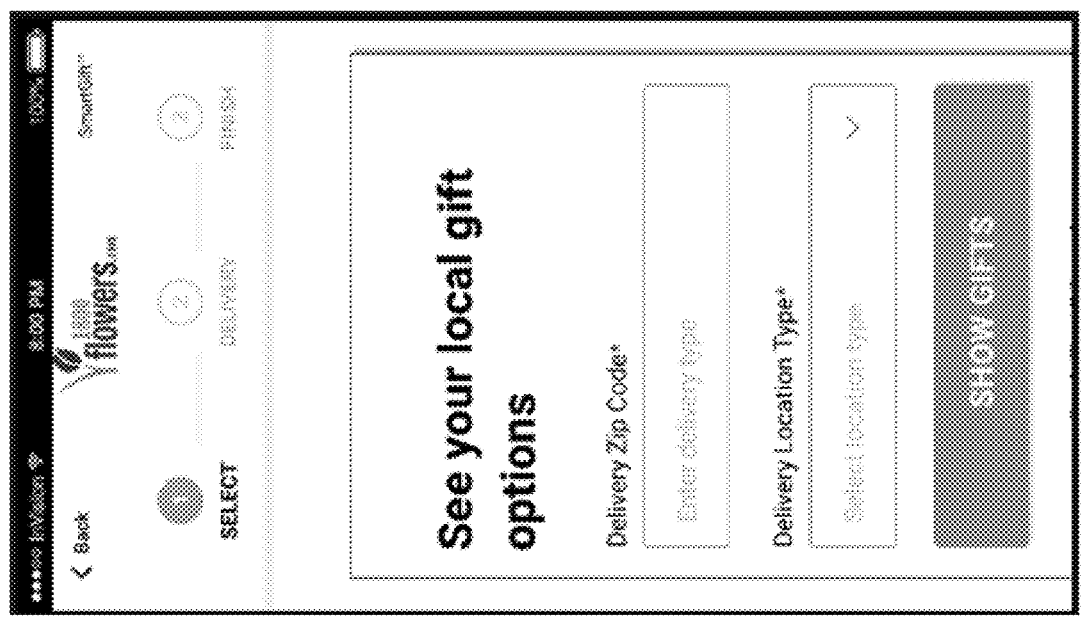
Figure 32:
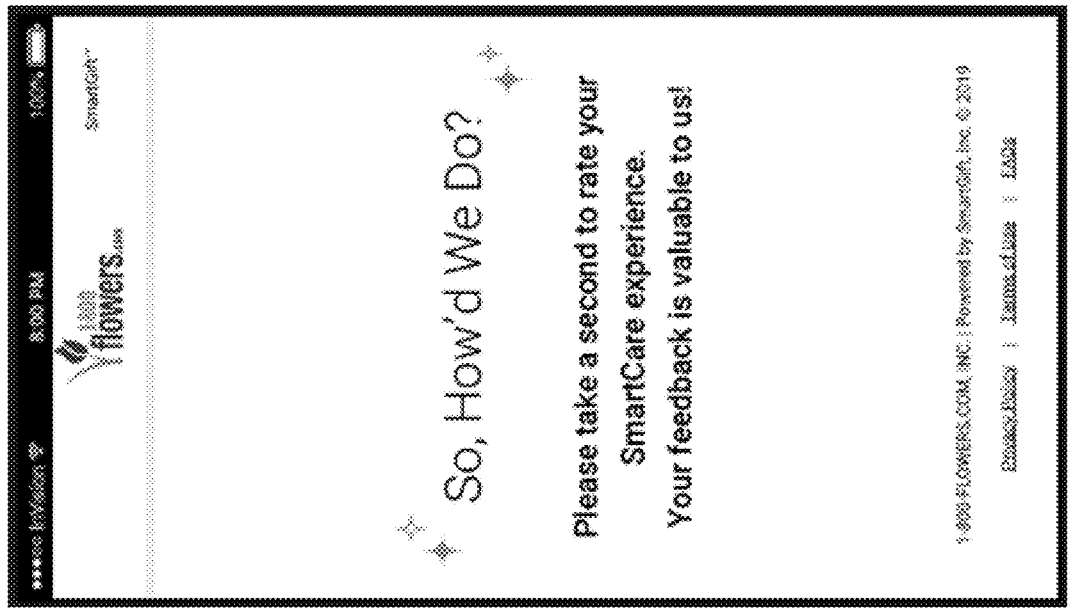
FIGS. 32 through 38 illustrate exemplary interfaces for providing service feedback according to an embodiment of the present invention.

Gift options are generated based on the gift transaction value, step 1608. FIGS. 26 and 28 present exemplary screens for selecting gift options including products to redeem with the gift transaction according to an embodiment of the present invention. The customer entity may be provided with an interface relating to a customer care center's or third-party merchant's products. The gift options may include a product assortment limited or filtered based on the gift transaction value. The customer can select and tailor a product (from the product assortment) with a preferred size, color, shape, configuration, and style, or swap for a different product. In one embodiment, the customer may also be presented with local gift options, as illustrated in FIG. 27.

Figures 29, 30:
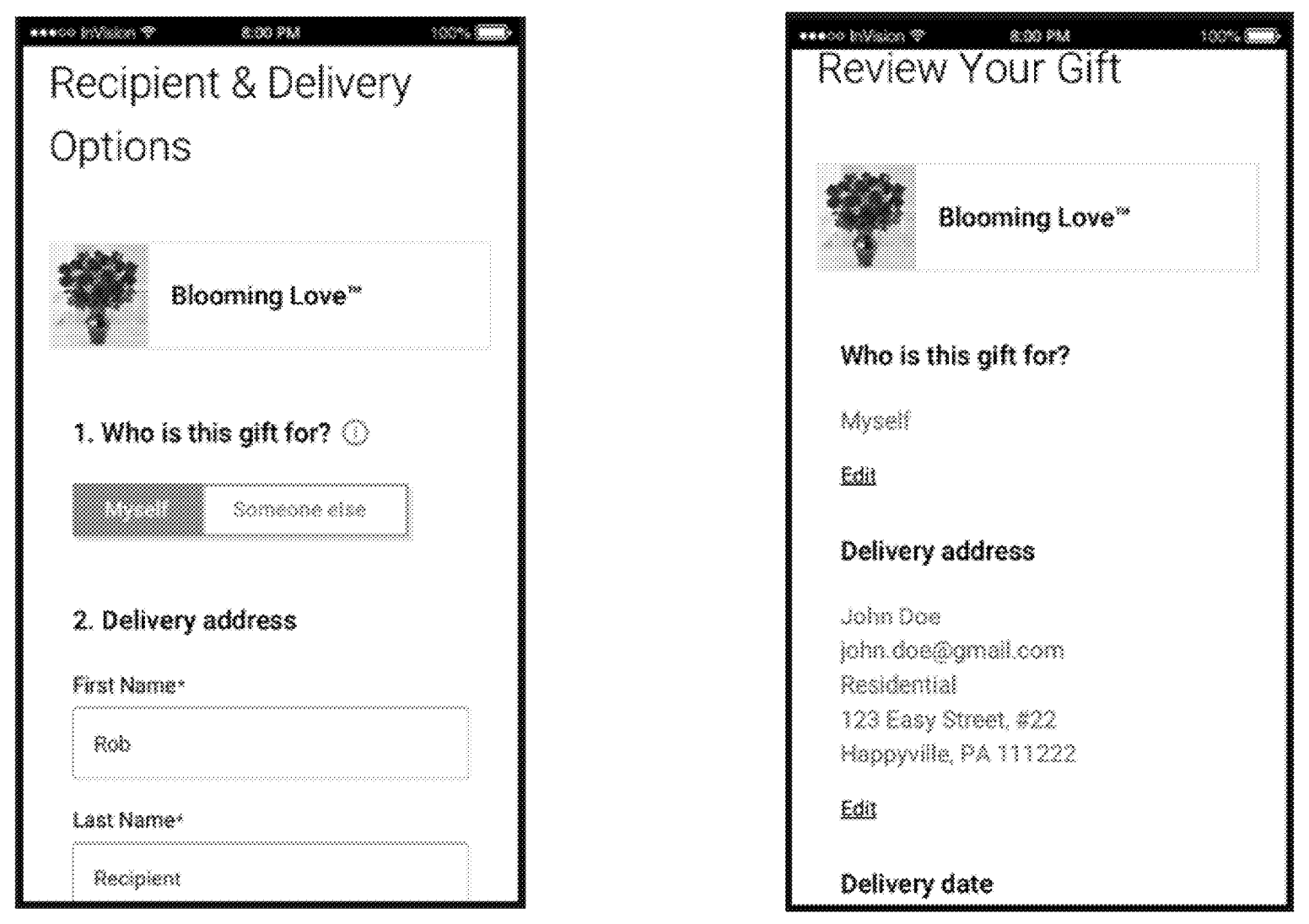

A selection from the gift options is received, step 1610. The selection may include a selection of one or more products from the gift options within the limits of the gift transaction value. Referring to FIG. 28, a customer selects a product to continue to redeem the gift transaction with the selected product. The interface may further prompt the customer of delivery details. FIGS. 29 through 30 provide exemplary interfaces for providing delivery information. The customer may enter information, such as a delivery address, delivery date, and optionally a gift message if the customer desires to gift the product to another person. According to one embodiment, the fulfillment server may provide the customer with an option to regift the gift transaction. The customer may instruct the fulfillment server to re-designate the gift transaction as a gift to another recipient and send a message to the new recipient with a link to redeem the gift transaction. The link may direct the new recipient again to the exemplary interfaces for providing delivery information.

Figure 31:
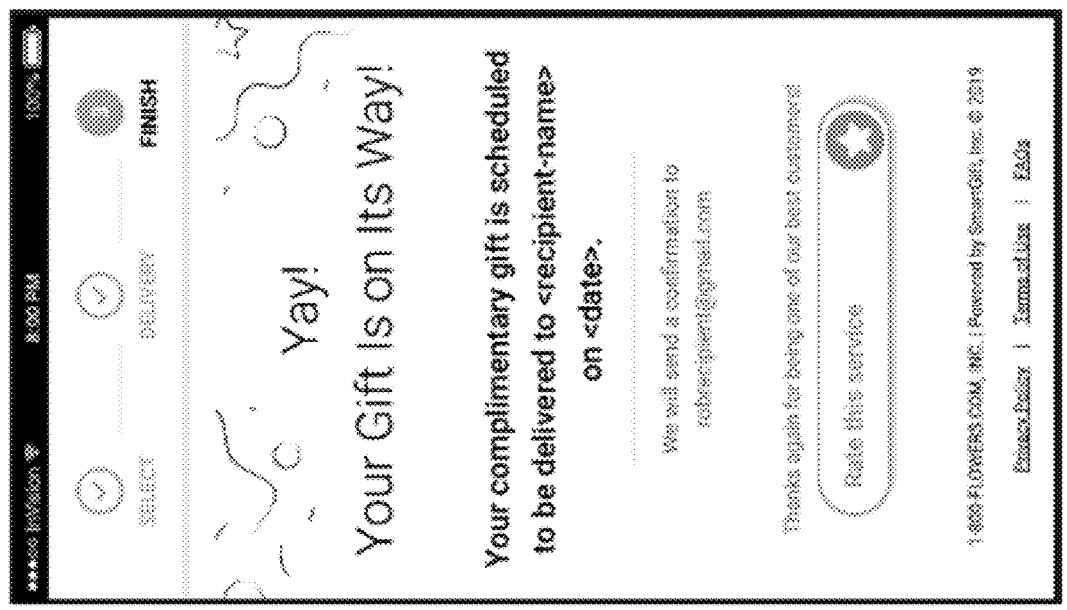
FIG. 31 illustrates an exemplary delivery confirmation and service feedback screen according to an embodiment of the present invention.
Figure 34:
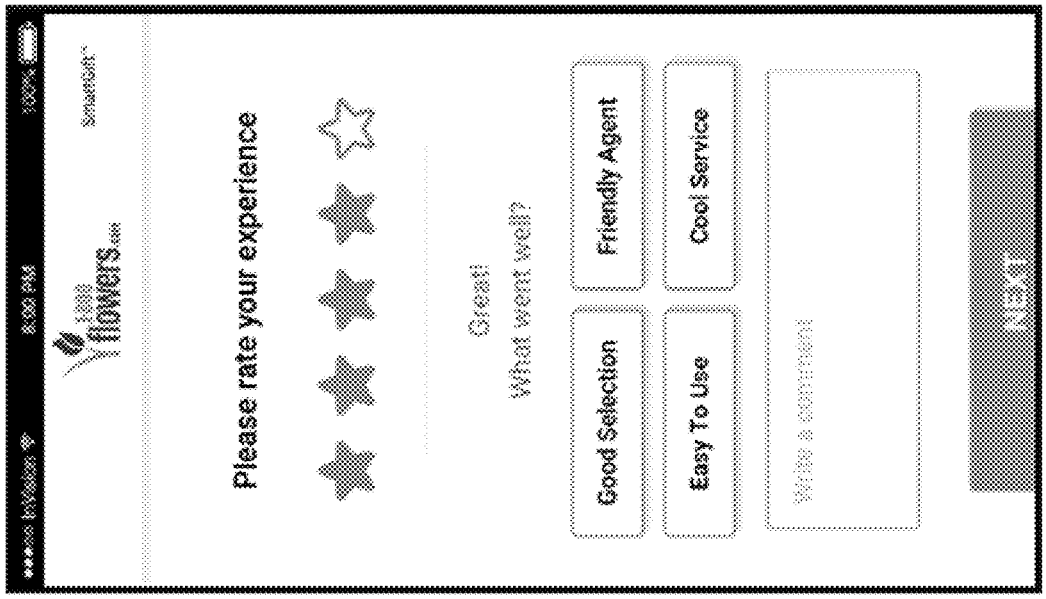
Figure 33:
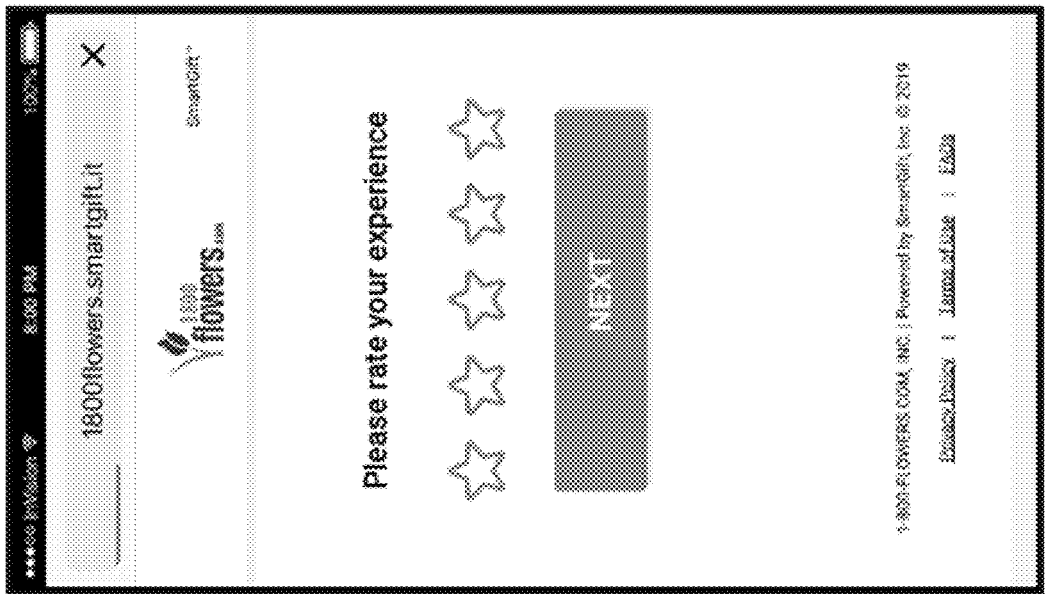

Delivery details are received, step 1612. The customer may submit the delivery details to redeem the gift transaction with the selection from the gift options. An order may be generated with the fulfillment server based on the selection and the delivery details, and the fulfillment server charges the value of the gift to a sender account (e.g., the customer care center), step 1614. A notification of completion of the gift redemption including delivery and confirmation information may be generated, as illustrated in FIG. 31.

Figure 36:
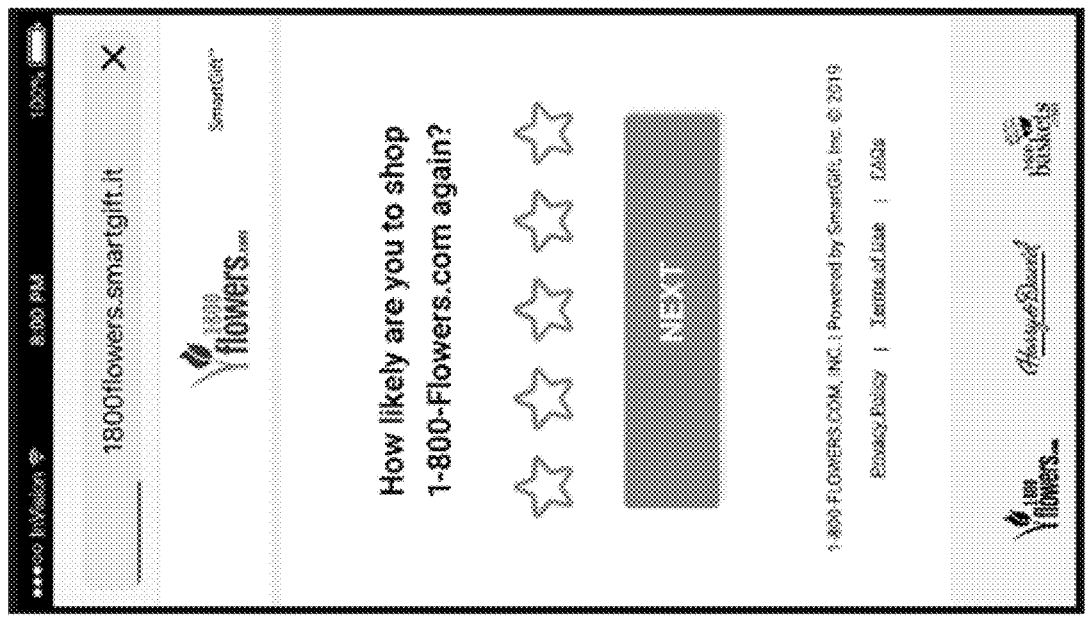
Figure 35:
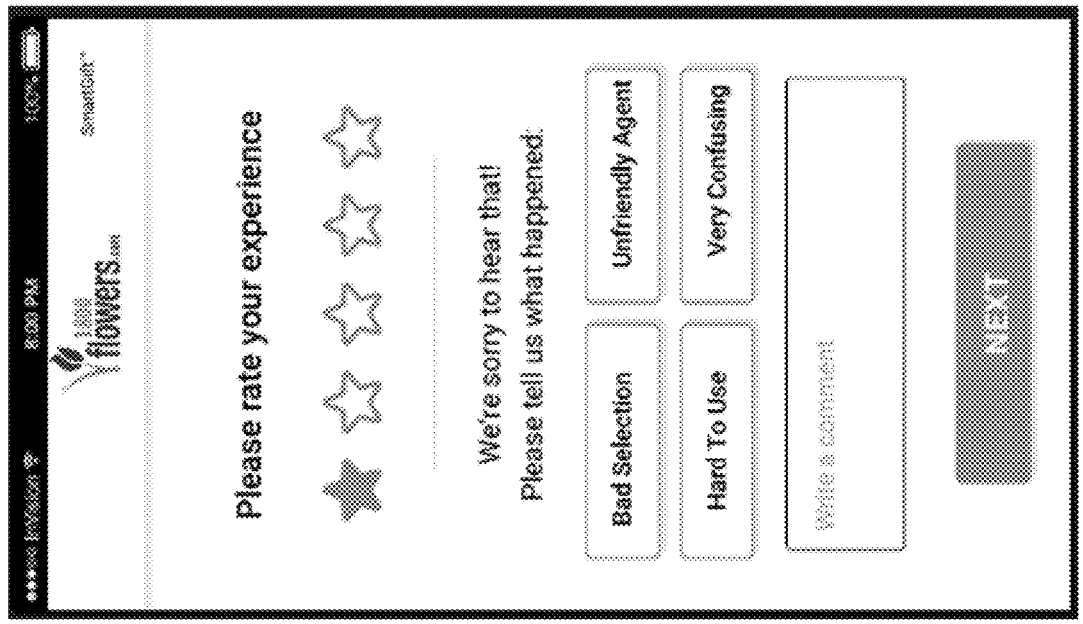
Figure 38:
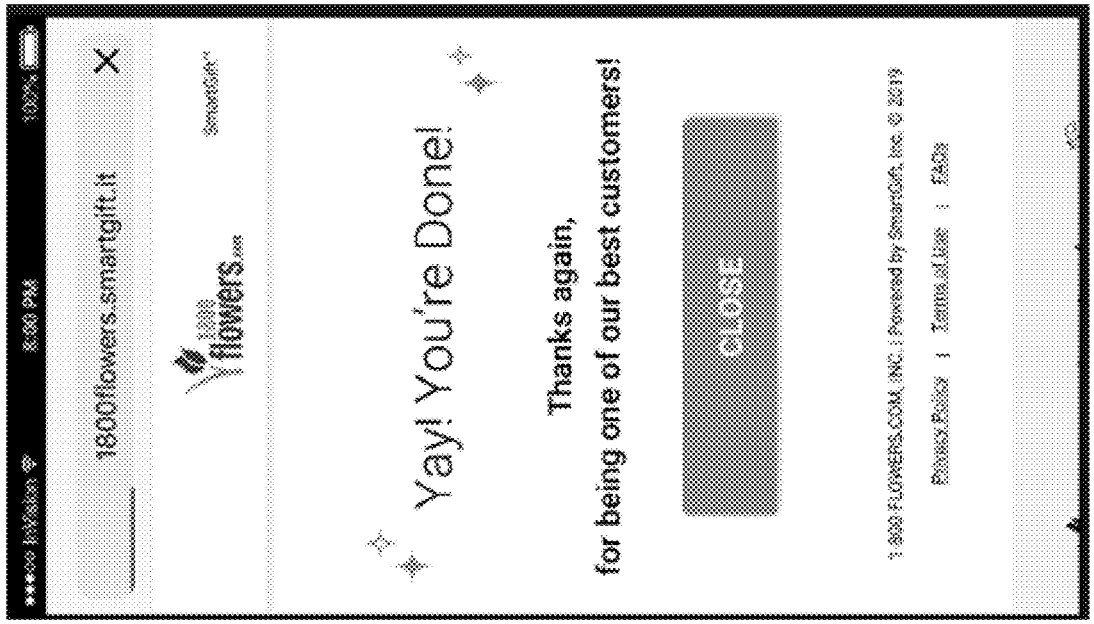
Figure 37:
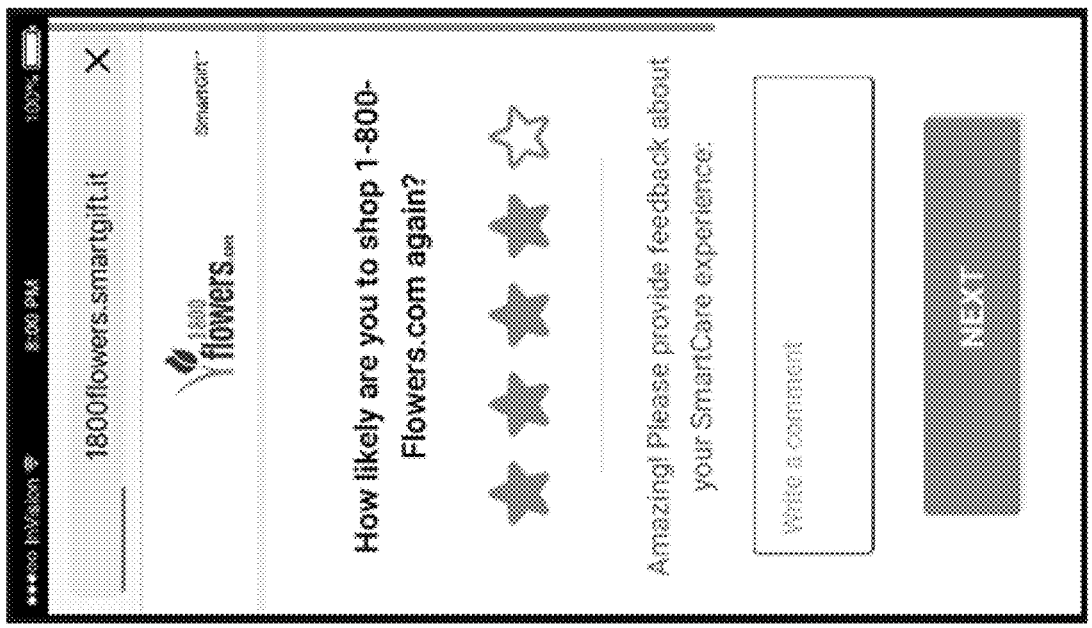

The notification of completion may also include a service feedback link that may be selected by the customer. A service feedback flow is generated, step 1616. The service feedback may be used to gain insights into a customers' product preferences for marketing, rewards and personalized offers. The customer may be taken to a series of screens for rating the gift experience. FIGS. 32 through 35 present exemplary interfaces for allowing customers to provide a rating of their experience by selecting a number of stars (e.g., from '1' through '5', '5' being the best) and providing comments. FIGS. 36 through 37 present exemplary interfaces for indicating how likely a customer will shop with a given website or merchant again. Customers may provide their likelihood of shopping again with the website or merchant by also selecting a number of stars and providing comments. Upon completion of the service feedback, the system may generate a "thank you" screen (FIG. 38) including a button to close out of the present screen.

Figure 39:
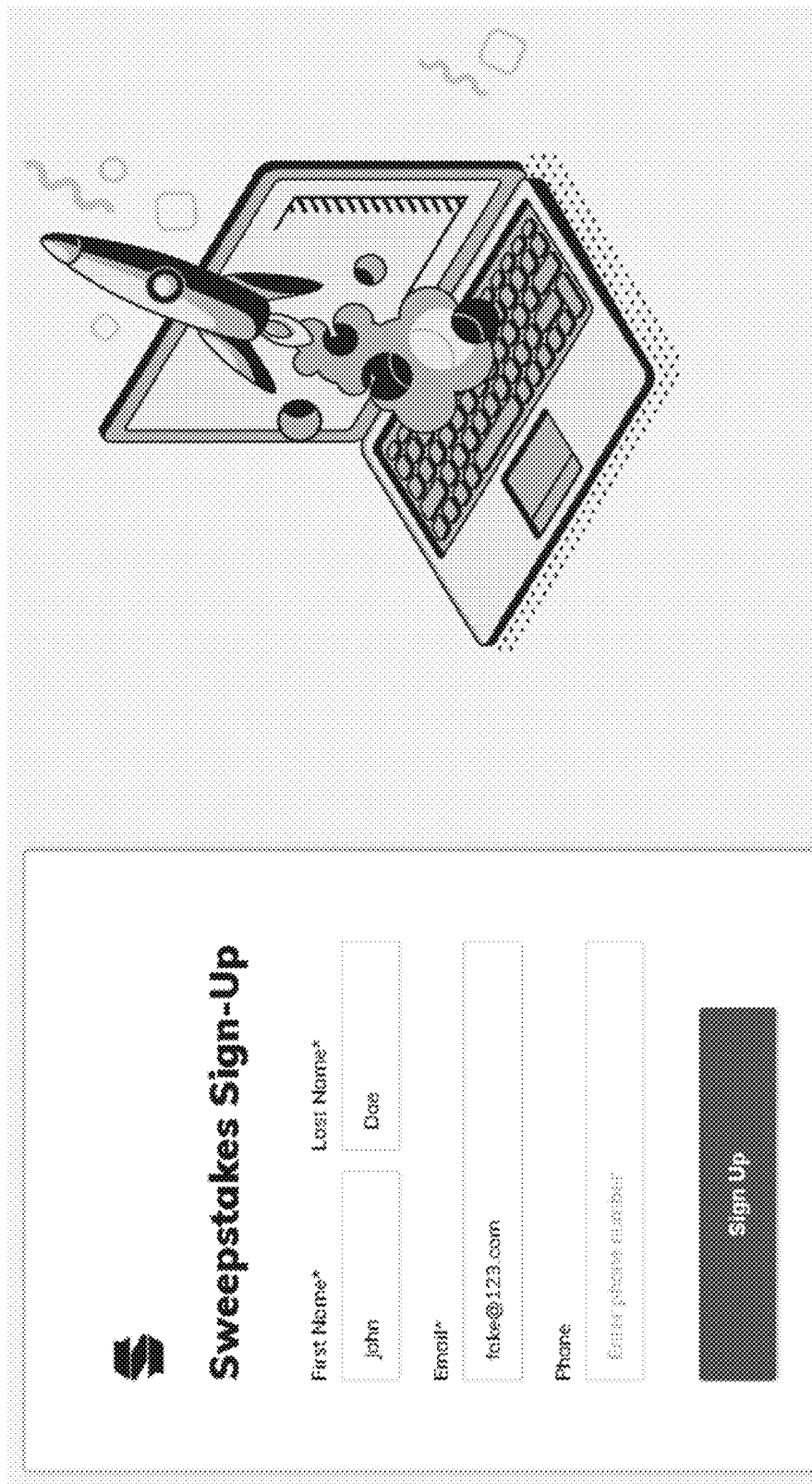
Figure 40:
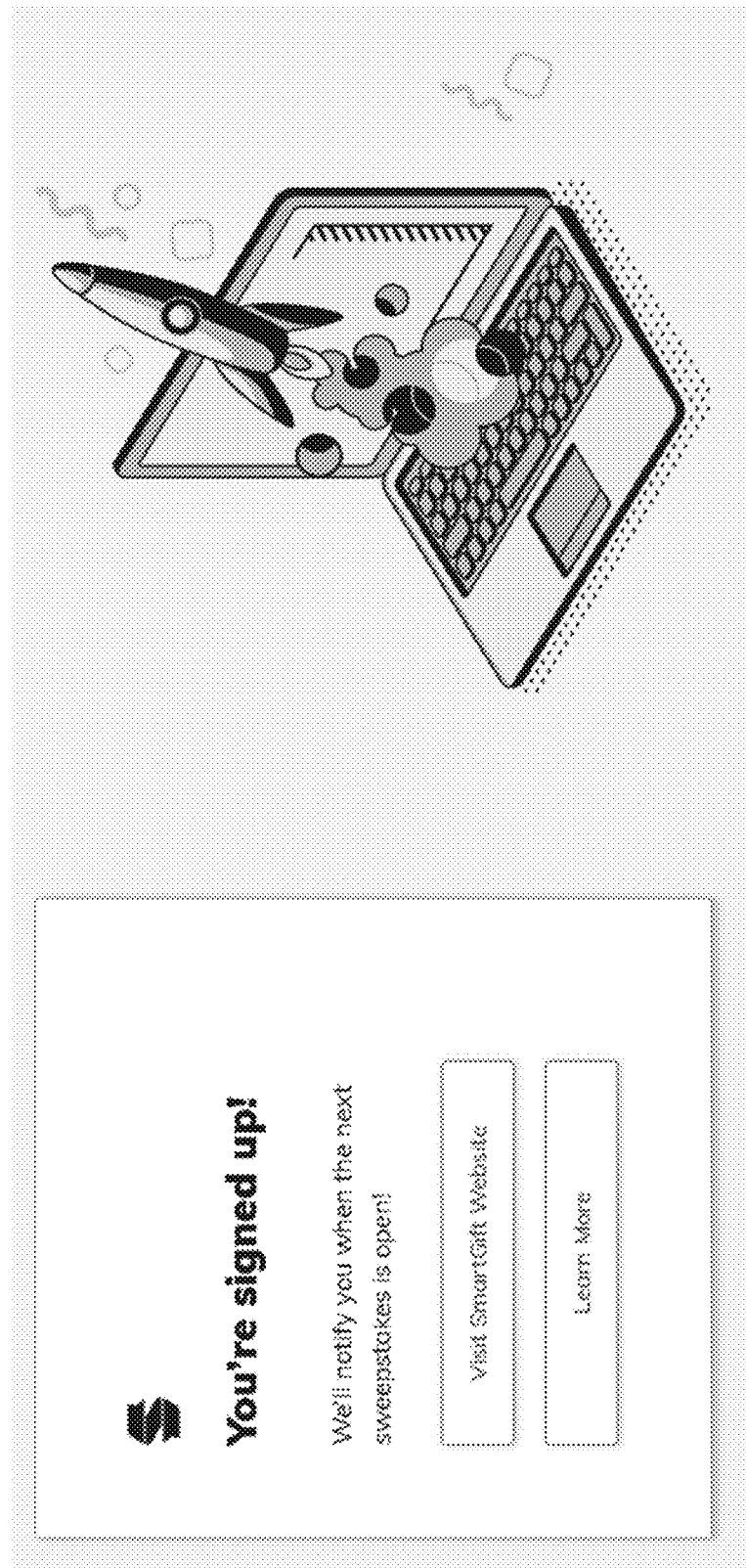
Figure 41:
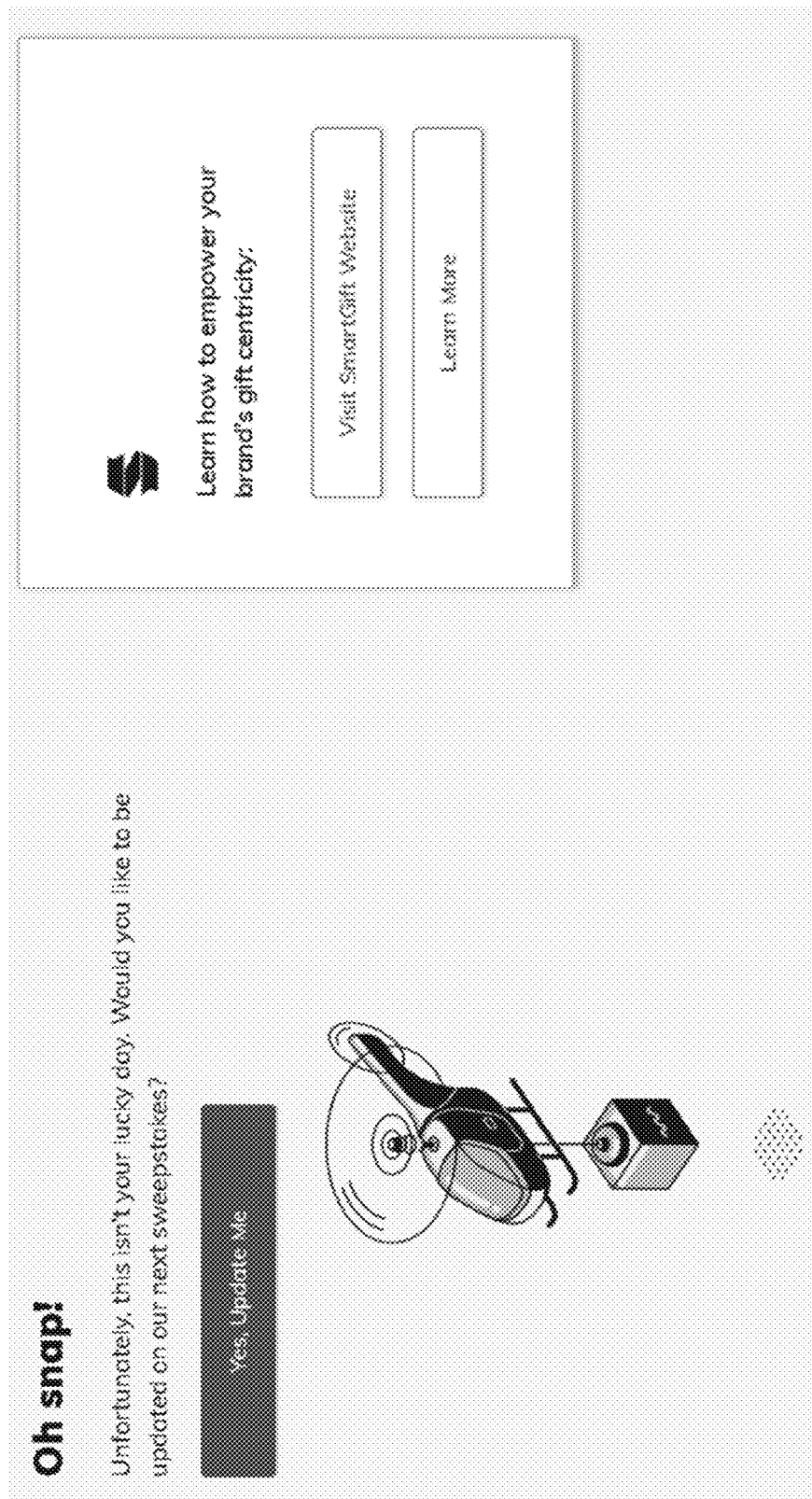

According to another aspect of the disclosed gift transaction system, the gift transaction system may be incorporated or integrated with a sweepstakes module for promoting products, brands, or services. FIG. 39 presents an exemplary interface for entering a sweepstakes according to an embodiment of the present invention. Contestants may provide their first name, last name, email address, and phone number to submit an entry into a sweepstakes. Upon submission, contestants may be presented with a screen confirming that they have been signed up and may be notified when another sweepstakes is open, as illustrated in FIG. 40. A contestant may find out whether they have won a sweepstakes by, for example, logging in to the sweepstakes module with verifying information, such as information entered for a sweepstakes. Contestants who have not won a sweepstakes may be presented with an interface, such as one presented in FIG. 41.

Figure 42:
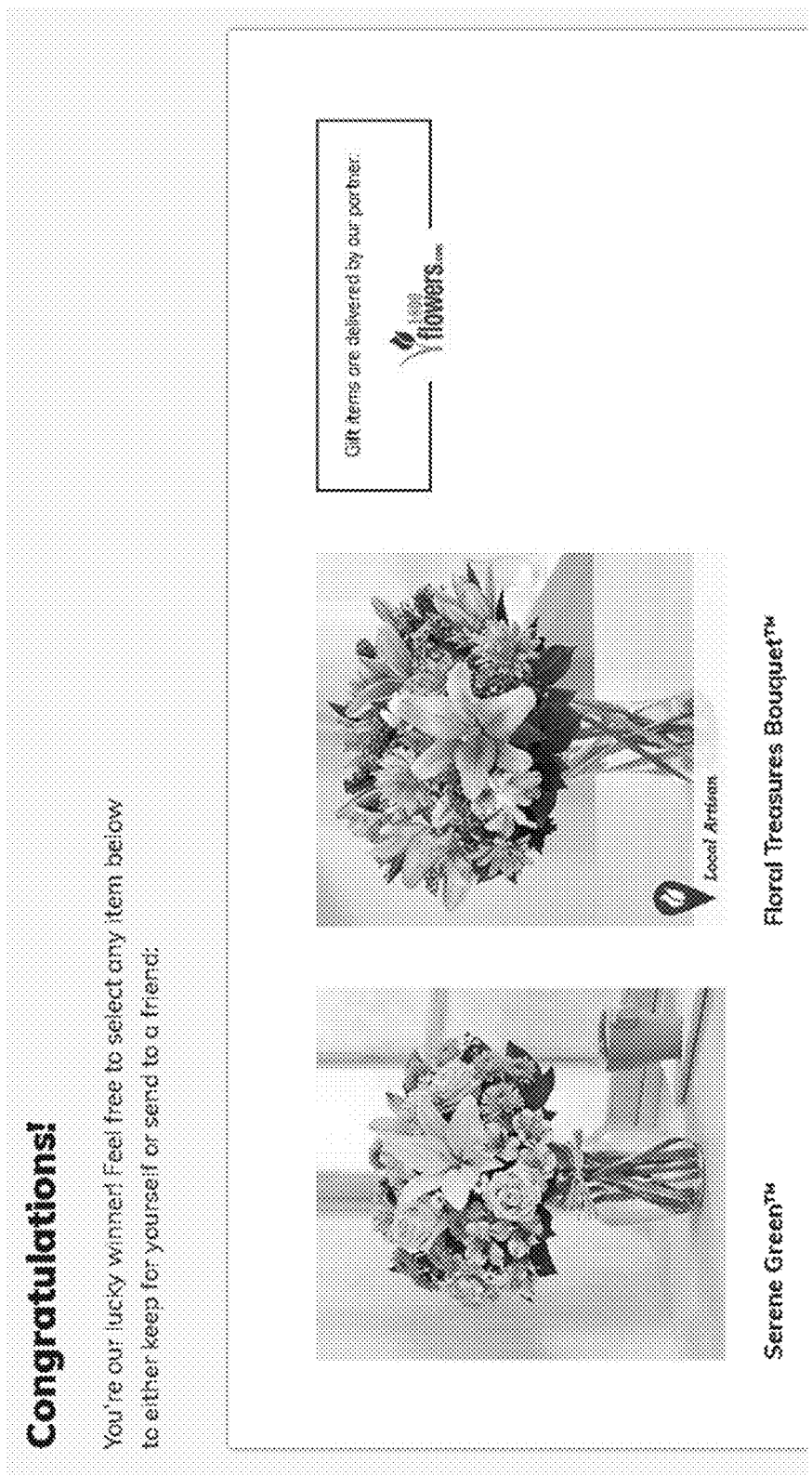
Figure 43:
Figure 45:
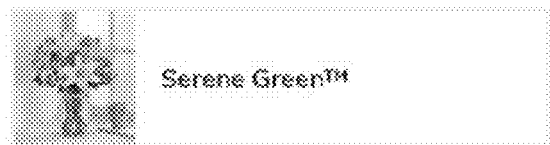
Figure 46:
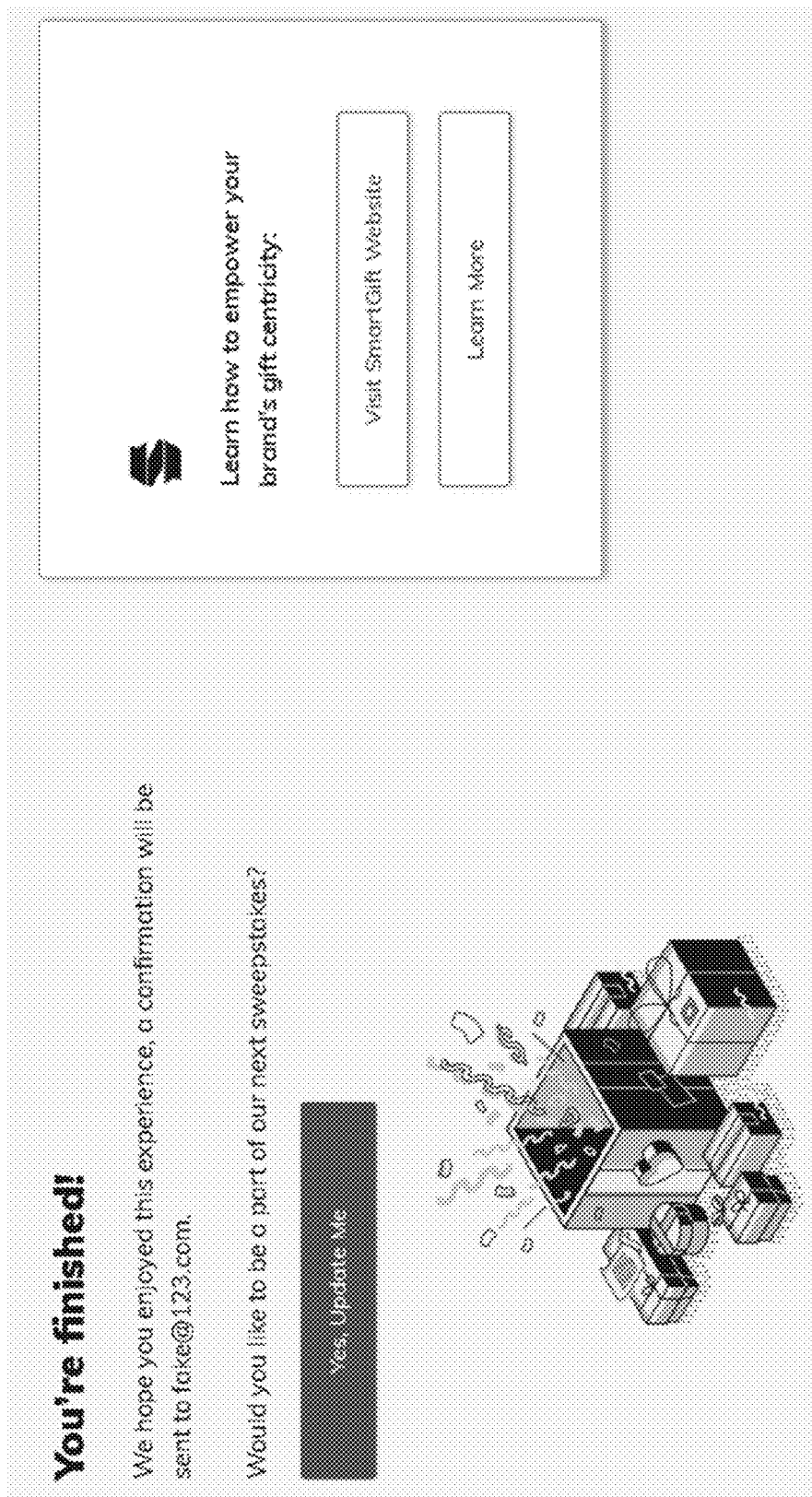

Contestants who have won a sweepstakes may be presented with an interface for redeeming a prize of the sweepstakes by choosing products from an assortment of products, as shown in FIG. 42. Each product in the assortment of products may be selected to view further details (FIG. 43) and confirmed for selection. Upon product selection, delivery and contact information (e.g., name, physical address, email address, etc.) may be submitted by the winning contestants in an interface, such as in FIG. 44. Details of the delivery of the product may be confirmed on a next display (FIG. 45). A confirmation screen may then be generated, such as one shown in FIG. 46, to indicate that a confirmation of the delivery of the product will be sent to an email address provided in the delivery and contact information. The winning contestant may also be provided with an option to be part of a next sweepstakes which includes a link to enter another sweepstakes by signing up via, for example, the interface in FIG. 39.

FIGS. 1 through 46 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for generating client appreciation and customer care gifts, the system comprising:
   a processor; and
   a memory having executable instructions stored thereon that when executed by the processor cause the processor to:
   receive a selection of a gift transaction value;
   extract customer recipient data from a contact list stored in a database associated with customer relations software accessible by a customer care center computer, the customer recipient data including names and email addresses or electronic accounts of a plurality of customer recipients;
   retrieve and display, by the customer relations software, a first gift set of product assortments from one or more third-party merchant servers, the first gift set being selected from a plurality of such gift set stored by the customer relations software for use in a plurality of different gift campaigns, the first gift set including at least a virtual gift set name and a gift transaction value;
   generate a virtual gift set based on the first gift set for the plurality of customer recipients via a gift module embedded to the customer relations software, the virtual gift set including the product assortments from the one or more third-party merchant servers that are limited to the gift transaction value;
   transmit the virtual gift set as a link in messages to the email addresses or electronic accounts of the plurality of customer recipients, the messages being branded as the customer care center computer and the link configured to redeem the virtual gift set by directing client devices that access the link to a website including an interface allowing the plurality of customer recipients to select from the product assortments from the one or more third-party merchant servers;
   present the virtual gift set to the client devices via the website;
   receive selection from the virtual gift set, the selection received from the client devices via the website;
   request or confirm delivery details using the customer recipient data to redeem the virtual gift set based on the selection from the virtual gift set; and
   generate an order with the one or more third-party merchant servers based on the selection from the virtual gift set and the delivery details.

2. The system of claim 1 wherein the processor charges the gift transaction value to an account based on the selection from the virtual gift set.

3. The system of claim 1 wherein the processor loads the customer recipient data from customer relationship manager software.

4. The system of claim 1 wherein the selection from the virtual gift set includes a selection selected from the group consisting of: size, color, shape, configuration, and style.

5. The system of claim 1 wherein the selection from the virtual gift set includes a swap for a different product.

6. The system of claim 1 wherein the processor regifts the virtual gift set to another recipient based on an instruction from a given one of the plurality of customer recipients.

7. The system of claim 1 wherein the processor generates a service feedback of product preferences.

8. The system of claim 1 wherein the processor transmits the link to the plurality of customer recipients via at least one of email, text message, and social network communications.

9. A method, in a communication environment including a third-party transaction server comprising a processor and a memory, for generating client appreciation and customer care gifts, the method comprising:
- receiving, by the third-party transaction server, a selection of a gift transaction value;
- extracting, by the third-party transaction server, customer recipient data from a contact list stored in a database associated with customer relations software accessible by a customer care center computer, the customer recipient data including names and email addresses or electronic accounts of a plurality of customer recipients;
- retrieving and displaying, by the customer relations software, a first gift set of product assortments from one or more third-party merchant servers, the first gift set being selected from a plurality of such gift set stored by the customer relations software for use in a plurality of different gift campaigns, the first gift set including at least a virtual gift set name and a gift transaction value;
- generating, by the third-party transaction server, a virtual gift set based on the first gift set for the plurality of customer recipients via a gift module embedded to the customer relations software, the virtual gift set including the product assortments from the one or more third-party merchant servers that are limited to the gift transaction value;
- transmitting, by the third-party transaction server, the virtual gift set as a link in messages to the email addresses or electronic accounts of the plurality of customer recipients, the messages being branded as the customer care center computer and the link configured to redeem the virtual gift set by directing client devices that access the link to a website including an interface allowing the plurality of customer recipients to select from the product assortments from the one or more third-party merchant servers;
- presenting, by the third-party transaction server, the virtual gift set to the client devices via the website;
- receiving, by the third-party transaction server, selection from the virtual gift set, the selection received from the client devices via the website;
- requesting or confirming, by the third-party transaction server, delivery details using the customer recipient data to redeem the virtual gift set based on the selection from the virtual gift set; and
- generating, by the third-party transaction server, an order with the one or more third-party merchant servers based on the selection from the virtual gift set and the delivery details.

10. The method of claim 9 further comprising charging the gift transaction value to an account based on the selection from the virtual gift set.

11. The method of claim 9 further comprising loading the customer recipient data from customer relationship manager software.

12. The method of claim 9 wherein the selection from the virtual gift set includes a selection selected from the group consisting of: size, color, shape, configuration, and style.

13. The method of claim 9 wherein the selection from the virtual gift set includes a swap for a different product.

14. The method of claim 9 further comprising regifting the virtual gift set to another recipient based on an instruction from a given one of the plurality of customer recipients.

15. The method of claim 9 further comprising generating a service feedback of product preferences.

16. The method of claim 9 further comprising transmitting the link to the plurality of customer recipients via at least one of email, text message, and social network communications.

17. A non-transitory computer-readable media comprising program code that when executed by a programmable processor causes execution of a method for generating client appreciation and customer care gifts, the method comprising:
- receiving a selection of a gift transaction value;
- extracting customer recipient data from a contact list stored on a database associated with customer relations software accessible by a customer care center computer, the customer recipient data including names and email addresses or electronic accounts of a plurality of customer recipients;
- retrieving and displaying, by the customer relations software, a first gift set of product assortments from one or more third-party merchant servers, the first gift set being selected from a plurality of such gift set stored by the customer relations software for use in a plurality of different gift campaigns, the first gift set including at least a virtual gift set name and a gift transaction value;
- generating a virtual gift set based on the first gift set for the plurality of customer recipients via a gift module embedded to the customer relations software, the virtual gift set including the product assortments from the third-party merchant server that are limited to the gift transaction value;
- transmitting the virtual gift set as a link in messages to the email addresses or electronic accounts of the plurality of customer recipients, the messages being branded as the customer care center computer and the link configured to redeem the virtual gift set by directing client devices that access the link to a website including an interface allowing the plurality of customer recipients to select from the product assortments from the third-party merchant server;
- presenting the virtual gift set to the client devices via the website;
- receiving selection from the virtual gift set, the selection received from the client devices via the website;
- requesting or confirming delivery details using the customer recipient data to redeem the virtual gift set based on the selection from the virtual gift set; and
- generating an order with the third-party merchant server based on the selection from the virtual gift set and the delivery details.

18. The system of claim 1 wherein the processor is further configured to generate a second virtual gift set for a second gift campaign via the gift module retrieving the first gift set from the customer relations software.

19. The method of claim 9 further comprising generating a second virtual gift set for a second gift campaign via the gift module retrieving the first gift set from the customer relations software.

20. The non-transitory computer-readable media of claim 17 wherein the method further comprises generating a second virtual gift set for a second gift campaign via the gift module retrieving the first gift set from the customer relations software.

* * * * *